United States Patent
Sharma et al.

(10) Patent No.: US 12,423,519 B1
(45) Date of Patent: Sep. 23, 2025

(54) APPLYING CASCADING MACHINE LEARNING MODELS TO COMMAND PROMPTS

(71) Applicant: Citibank, N.A., New York, NY (US)

(72) Inventors: Maneet Sharma, New York, NY (US); Adar K. Danait, New York, NY (US); Flora P. Sah, New York, NY (US); Krishnendu Chatterjee, New York, NY (US); Rama Koteswara Rao Kandimalla, New York, NY (US); Pavithra Araleri Visweswariah, New York, NY (US); Djona Fegnem, New York, NY (US); Swati Mittal, New York, NY (US); Paul Joseph Zakharia, New York, NY (US); Paul Edward Hibbs, New York, NY (US); James Michael Iacona, New York, NY (US)

(73) Assignee: CITIBANK, N. A.

( * ) Notice: Subject to any disclaimer, the term of this patent is extended or adjusted under 35 U.S.C. 154(b) by 0 days.

(21) Appl. No.: 19/017,003

(22) Filed: Jan. 10, 2025

Related U.S. Application Data

(63) Continuation-in-part of application No. 18/582,425, filed on Feb. 20, 2024.

(51) Int. Cl.
*G06F 40/20* (2020.01)
*G06F 21/57* (2013.01)

(52) U.S. Cl.
CPC ............ *G06F 40/20* (2020.01); *G06F 21/577* (2013.01)

(58) Field of Classification Search
CPC ................. G06F 40/211; G06F 21/577; G06F 16/24522; G06F 21/552; G06F 40/30;
(Continued)

(56) References Cited

U.S. PATENT DOCUMENTS 10,659,403 B2 * 5/2020 Smullen .................. H04L 69/14
12,295,675 B2 * 5/2025 Roh ......................... G10L 15/26
(Continued)

OTHER PUBLICATIONS

International Search Report and Written Opinion in Application No. PCT/US25/16664, dated Mar. 11, 2025, 14 pages.

*Primary Examiner* — Abdelali Serrou
(74) *Attorney, Agent, or Firm* — Perkins Coie LLP

(57) ABSTRACT

Methods and descriptions are described herein for applying cascading machine learning models to command prompts. In particular, the system may receive a query indicating a computing process to be performed. The system may input a command prompt based on the query into a first instance of an LLM, which may output activities for performing the process. The system may input a first activity into a second instance of the LLM, which may output vulnerabilities associated with the first activity. The system may input a first vulnerability into a third instance of the LLM, which may output indications of available control tools for addressing the first vulnerability. The system may input a first control tool into a fourth instance of the LLM, which may output indications of monitoring tools for monitoring the first control tool. The system may then cause implementation of the first control tool and the first monitoring tool.

20 Claims, 10 Drawing Sheets

(58) Field of Classification Search
CPC .... G06F 40/40; G06F 16/3329; G06F 16/243; G06F 21/554; G06F 40/20; G06F 16/345; G06F 16/9024; G06F 21/31; G06F 40/279; G06F 40/284; G06F 16/334; G06F 16/3344; G06F 16/338; G06F 21/566; G06F 40/166; G06F 40/35; G06F 8/35; G06F 11/3604; G06F 16/2423; G06F 16/24575; G06F 16/90332; G06F 21/563; G06F 21/6227; G06F 2221/2101; G06F 2221/2113; G06F 2221/2141; G06F 40/169; G06F 40/186; G06F 40/216; G06F 40/47; G06F 40/56; G06F 8/30; G06F 8/33; G06F 8/34; G06F 8/427; G06F 9/44589; G06F 9/453; G06F 9/547; G06F 11/3476; G06F 11/3624; G06F 16/22; G06F 16/2237; G06F 16/2455; G06F 16/24573; G06F 16/248; G06F 16/252; G06F 16/3331; G06F 16/3334; G06F 16/3347; G06F 16/337; G06F 16/9038; G06F 16/93; G06F 16/9532; G06F 16/9538; G06F 16/954; G06F 18/214; G06F 18/22; G06F 21/6245; G06F 21/64; G06F 2221/034; G06F 3/04812; G06F 3/0484; G06F 3/0486; G06F 30/27; G06F 40/117; G06F 40/134; G06F 40/143; G06F 40/174; G06F 40/197; G06F 40/205; G06F 40/295; G06F 8/42; G06F 8/51; G06F 9/451; G06F 9/541; G10L 13/08; G10L 15/22

See application file for complete search history.

(56) References Cited

U.S. PATENT DOCUMENTS

| | | | |
|---|---|---|---|
| 2018/0212904 A1* | 7/2018 | Smullen | H04L 63/18 |
| 2023/0244938 A1* | 8/2023 | Wei | G06N 3/045 |
| | | | 706/25 |
| 2024/0111719 A1* | 4/2024 | Gentile | G06F 16/156 |
| 2024/0419835 A1* | 12/2024 | Karlberg | G06F 16/3329 |
| 2025/0005057 A1* | 1/2025 | Khosla | G06F 40/40 |
| 2025/0013438 A1* | 1/2025 | Goodman | G06F 8/34 |
| 2025/0028794 A1* | 1/2025 | Ailawadi | G06F 8/33 |

\* cited by examiner

APPLYING CASCADING MACHINE LEARNING MODELS TO COMMAND PROMPTS

CROSS-REFERENCE TO RELATED APPLICATIONS

This application is a continuation-in-part of U.S. patent application Ser. No. 18/582,425 filed Feb. 20, 2024, entitled "CASCADING COMMAND SET ENGINEERING." The content of the foregoing application is incorporated herein in its entirety by reference.

SUMMARY

Generating accurate and complete commands for large language models (LLMs) presents significant technological challenges. The inherent complexity of natural language and the variability in user inputs contribute to the difficulty in ensuring that LLMs produce correct and comprehensive responses. Conventional approaches to command generation often result in incorrect or incomplete outputs, which can lead to inefficiencies and errors in the processes that rely on these commands. Addressing these issues requires a sophisticated system capable of understanding and processing natural language queries with high precision.

Traditional methods for prompting LLMs may involve straightforward input-output mechanisms, where a simple prompt is provided, and a response is generated. However, this approach does not adequately account for the nuances and context-specific requirements of different queries. For instance, a generic prompt may yield a response that is too broad or too narrow, failing to capture the specific needs of the user. Moreover, prompts may include compound questions, in which sub-questions within the prompts are interdependent. Compound questions may require the LLM to not only understand and process each sub-question individually but also to recognize and maintain the logical and contextual relationships between them. This complexity may lead to difficulties in generating coherent and accurate responses, as the model must ensure that the answer to each sub-question aligns with and supports the answers to the other sub-questions. Additionally, the interdependencies can cause the model to misinterpret the intent of the prompt, resulting in fragmented or inconsistent responses. These limitations are particularly problematic in complex scenarios where precise and context-aware responses are crucial. As such, conventional prompting techniques do not effectively mitigate the risk of incorrect or incomplete command generation.

To address these challenges, multiple cascading instances of an LLM, each trained and prompted differently to enhance the accuracy and completeness of the generated commands, may be used. The outputs of a first instance of the LLM may be fed into a subsequent instance of the LLM, and so on, enabling complex prompts to be processed across multiple specialized instances of the LLM in a cascading manner. As an illustrative example, the system may receive a natural language query indicating a process (e.g., a computing process) to be performed. The query may request information regarding activities associated with the process, vulnerabilities associated with the activities, controls for the vulnerabilities, and monitors for the controls. As discussed above, this query may be a compound prompt that conventional LLMs are ill-equipped to handle with accuracy. This query may be input into a first instance of the LLM, which is specifically trained to output activities required to perform the process. The system may input one of these activities into a second instance of the LLM, which is trained to identify potential vulnerabilities associated with that activity. One of these vulnerabilities may then be input into a third instance of the LLM, which is trained to predict control tools for mitigating these vulnerabilities. Finally, the system may input one of these control tools into a fourth instance of the LLM, which is trained to recommend monitoring tools for overseeing the implementation of the control tools. This cascading approach ensures that the system generates accurate and complete commands at each step in order to receive more accurate outputs at each step.

In particular, the system may receive a natural language query indicating a process to be performed. This query may be processed by the system to understand the specific requirements and context of the task. For example, the system may input, into a first instance of a large language generative model, a command prompt based on the query. In some embodiments, the first instance of the large language generative model is trained to predict activities based on natural language queries. The command prompt may instruct the first instance of the large language generative model to output activities for performing the process. In some embodiments, this causes the first instance of the large language generative model to output the activities for performing the process. For example, the activities may include steps or tasks that are required to perform the process.

In some embodiments, the system may input, into a second instance of the large language generative model, one of the activities. This may cause the second instance of the large language generative model to output vulnerabilities associated with the activity. In some embodiments, the second instance of the large language generative model is trained to predict vulnerabilities based on activities. In some embodiments. In some embodiments, vulnerabilities may include risks to a system associated with the process when certain activities are undertaken.

In some embodiments, the system may input, into a third instance of the large language generative model, one of the vulnerabilities. This may cause the third instance of the large language generative model to output control tools for addressing the first vulnerability. In some embodiments, the third instance of the large language generative model is trained to identify, for vulnerabilities, control tools of one or more available control tools. In some embodiments, control tools may mitigate the risks associated with the activities required to perform the process.

In some embodiments, the system may input, into a fourth instance of the large language generative model, one of the control tools. This may cause the fourth instance of the large language generative model to output monitoring tools for monitoring the first control tool. In some embodiments, the fourth instance of the large language generative model is trained to identify monitoring tools for control tools. In some embodiments, monitoring tools may enable the system to monitor the progress or effectiveness of the control tools in mitigating the risks associated with the activities required to perform the process.

In some embodiments, the system may transmit an instruction to a system associated with the vulnerability. The instruction may include indications of a certain control tool and a certain monitoring tool. For example, the certain control tool and the certain monitoring tool may be selected or processed as described above. The instruction may also include implementation instructions for implementing the certain control tool and the certain monitoring tool. The instruction may cause the system to implement the certain control tool and the certain monitoring tool according to the implementation instructions. For example, the system may implement the certain control tool to mitigate risks associated with activities required to perform a process and the system may implement the certain monitoring tool to monitor the progress or effectiveness of the control tool.

BRIEF DESCRIPTION OF THE DRAWINGS

FIGS. 2-1 and 2-2 show an example component risk generator application, which can operate as part of the computing platform for cascading command set engineering, in accordance with some implementations of the present technology.

FIGS. 4A, 4B-1 and 4B-2 show an example architecture and graphical user interface (GUI) of a component risk corrector application, which can operate as part of the computing platform for cascading command set engineering, in accordance with some implementations of the present technology.

Figure 1:
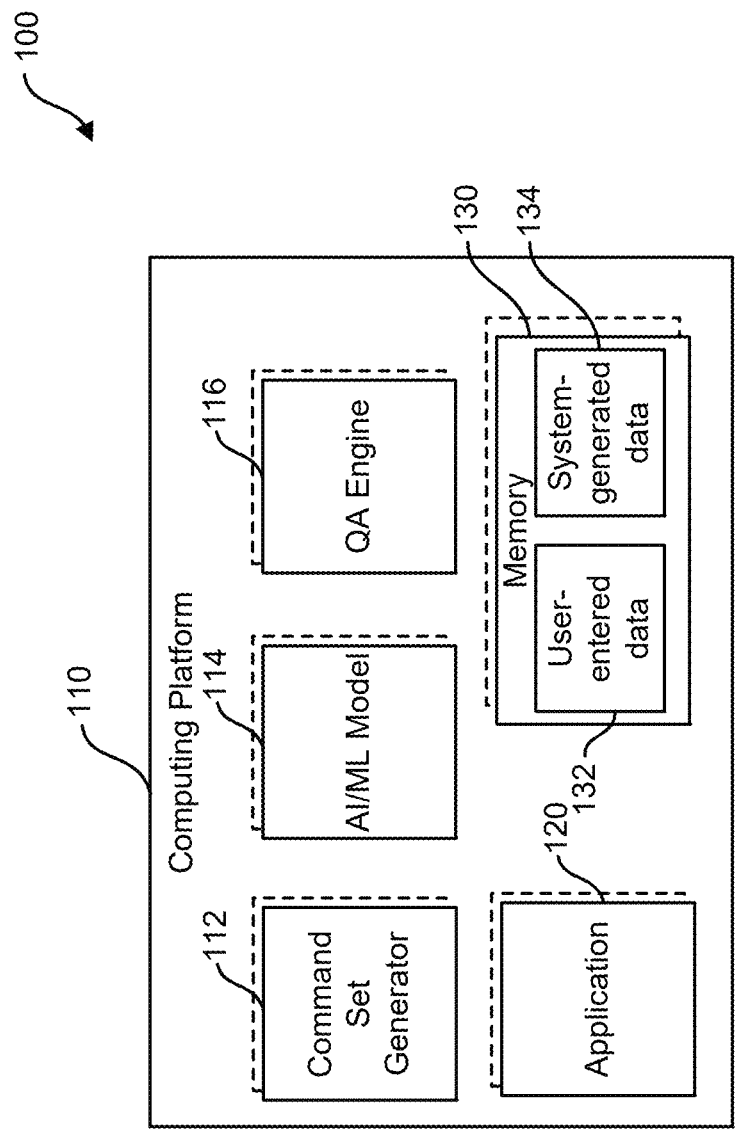
FIG. 1 shows an example computing environment that includes a computing platform for cascading command set engineering, in accordance with some implementations of the present technology.

The drawings have not necessarily been drawn to scale. For example, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Methods and systems described herein may use multiple cascading instances of an LLM, each trained and prompted differently, to enhance the accuracy and completeness of the generated commands. The outputs of a first instance of the LLM may be fed into a subsequent instance of the LLM, and so on, enabling complex prompts to be processed across multiple specialized instances of the LLM in a cascading manner. As an illustrative example, the system may receive a natural language query indicating a process to be performed. The query may request information regarding activities associated with the process, vulnerabilities associated with the activities, controls for the vulnerabilities, and monitors for the controls. As discussed above, this query may be a compound prompt that conventional LLMs are ill-equipped to handle with accuracy. This query may be input into a first instance of the LLM, which is specifically trained to output activities required to perform the process. The system may input one of these activities into a second instance of the LLM, which is trained to identify potential vulnerabilities associated with that activity. One of these vulnerabilities may then be input into a third instance of the LLM, which is trained to predict control tools for mitigating these vulnerabilities. Finally, the system may input one of these control tools into a fourth instance of the LLM, which is trained to recommend monitoring tools for overseeing the implementation of the control tools. This cascading approach ensures that the system generates accurate and complete commands at each step in order to receive more accurate outputs at each step.

In some embodiments, methods and systems described herein may use multiple cascading agents or small language models (SLMs), each trained and prompted differently. The outputs of a first agent or SLM may be fed into a subsequent agent or SLM, and so on, enabling complex prompts to be processed across multiple specialized models in a cascading manner. As an illustrative example, the system may receive a natural language query indicating a process to be performed. The query may request information regarding activities associated with the process, vulnerabilities associated with the activities, controls for the vulnerabilities, and monitors for the controls. This query may be input into a first agent, which is specifically trained to output activities required to perform the process. The system may input one of these activities into a second agent, which is trained to identify potential vulnerabilities associated with that activity. One of these vulnerabilities may then be input into a third agent, which is trained to predict control tools for mitigating these vulnerabilities. Finally, the system may input one of these control tools into a fourth agent, which is trained to recommend monitoring tools for overseeing the implementation of the control tools. This cascading approach allows the system to leverage agents or SLMs that are specifically trained for each of the cascading tasks.

As an illustrative example, the natural language query may include "What are the activities, risks, controls, and monitors associated with implementing a vector database?" The system may input a command prompt based on the query into a first instance of an LLM. This may cause the first instance of the LLM to output activities associated with the process of implementing a vector database. Example activities may include, for example, "install a vector database," "define a data schema," "import and vectorize the data," "define database optimizations," and "maintain the database." Activities in a set of activities may be associated with a set of risks or vulnerabilities. The system may input one of the activities into a second instance of the LLM. This may cause the second instance of the LLM to output vulnerabilities associated with the activity. For example, "import and vectorize the data" may be associated with a risk of "data breach." Risks or vulnerabilities may be controlled using various control tools. The system may input one of the vulnerabilities into a third instance of the LLM. This may cause the third instance of the LLM to select control tools for controlling the vulnerability from among the control tools available to the system. Two example controls associated with "data breach" may be "audit logging" and "data encryption." The system may use various monitoring tools to monitor the effectiveness of the control tool at controlling the vulnerability. The system may input one of the control tools into a fourth instance of the LLM. This may cause the fourth instance of the LLM to select monitoring tools for monitoring the control tool from among the monitoring tools available to the system. An example monitoring operation associated with "data encryption" for vector databases may be, for example, "encryption tool patching." The system may then implement control and monitoring tools, such as data encryption and encryption tool patching, in connection with the process of implementing the vector database.

As an illustrative example, the natural language query may include "What are the activities, risks, controls, and monitors associated with offering overdraft protection to authenticated customers through a telecentre?" The activity may include "issuance of overdraft protection to authenticated customers through a telecentre." The system may input a command prompt based on the activity into a first instance of an LLM. This may cause the first instance of the LLM to output risks associated with the process of issuing overdraft protection. Example risks may include, for example, "customer authentication" and "call recording and screen capture technology." Risks in a set of risks may be associated with a set of controls. The system may input one of the risks into a second instance of the LLM. This may cause the second instance of the LLM to output controls associated with the risk. For example, "customer authentication" may be controlled using "automated personal identification number (PIN) authentication or customer questions," and "call recording and screen capture technology" may be controlled using a "recording capture system." Controls may be monitored using various monitoring tools. The system may input one of the controls into a third instance of the LLM. This may cause the third instance of the LLM to select monitoring tools for monitoring the control from among the monitoring tools available to the system. Two example monitoring operations associated with "automated PIN authentication or customer questions" and a "recording capture system" may be a "manager review of call recording" and "technology system functionality reporting," respectively. The system may then implement certain control and monitoring tools, such as automated PIN authentication and manager review of call recordings, in connection with the process of issuing overdraft protection to authenticated customers through the telecentre.

In particular, the system may receive a natural language query indicating a process to be performed. As an example, the query may include, "What are the activities, risks, controls, and monitors associated with implementing a vector database?" or "What are the activities, risks, controls, and monitors associated with offering overdraft protection to authenticated customers through a telecentre?" This query may be processed by the system to understand the specific requirements and context of the task. Upon receiving this query, the system may employ advanced natural language processing (NLP) techniques to parse the query, identifying key components such as the process (e.g., "implementing a vector database"), specific requests (e.g., "activities, risks, controls, and monitors" associated with the process), and any contextual information provided. By accurately understanding the query, the system ensures that the generated responses are relevant and tailored to the user's needs.

The system may generate a command prompt based on the natural language query. For example, upon receiving the query, the system may translate this query into a structured command prompt suitable for input into a large language generative model, such as an LLM. This command prompt may be designed to translate the query into a format that the LLM may process effectively. This process may involve not only rephrasing the query but also incorporating any necessary context or specific instructions that guide the LLM in generating comprehensive and accurate responses. The prompt may be formulated for a first instance of an LLM that is trained to output activities associated with processes. The command prompt may instruct the first instance of the large language generative model to output one or more activities for performing the process identified in the query. For example, a command prompt for the first instance of the LLM may be "List the activities required to implement a vector database" or "List the activities required to offer overdraft protection to authenticated customers through a telecentre." By generating a precise and well-structured command prompt, the system may leverage the LLM's capabilities to produce detailed and relevant outputs.

The system may input the command prompt into the first instance of the LLM. The first instance of the LLM may be trained to predict activities based on natural language queries or command prompts. This training may involve exposing the LLM to a vast corpus of data that includes various tasks, processes, and their associated activities. The first instance of the LLM may be trained using any of the techniques discussed in greater detail below. In some embodiments, inputting the command prompt into the first instance of the LLM may cause the first instance to output activities associated with the process. For example, the first instance of the LLM may output activities associated with the process of "implementing a vector database," such as "install a vector database," "define a data schema," "import and vectorize the data," "define database optimizations," and "maintain the database." In some embodiments, an activity may be "issuance of overdraft protection to authenticated customers through a telecentre."

In some embodiments, the system may utilize a first agent specially trained to predict activities associated with a certain process input into the first agent. Training may involve exposing the first agent to a vast dataset containing various examples of processes and their corresponding activities. This dataset may include detailed descriptions and sequences of tasks, such as those involved in "implementing a vector database." The training process may involve the use of machine learning algorithms, which may enable the first agent to identify patterns and correlations between different activities and the overarching process. For instance, the first agent may learn to recognize that "install a vector database," "define a data schema," "import and vectorize the data," "define database optimizations," and "maintain the database" are all integral activities associated with the implementation of a vector database. Additionally, the first agent may be fine-tuned through iterative testing and validation, where its predictions are compared against known outcomes to ensure accuracy and reliability. This training approach may equip the first agent with the capability to predict and suggest relevant activities for a wide range of processes. Upon receiving the input of a process, such as "implementation of a vector database," the first agent may output associated activities, such as "install a vector database," "define a data schema," "import and vectorize the data," "define database optimizations," and "maintain the database."

In some embodiments, each activity may be associated with an activity-related natural language response. For example, the first instance of the LLM may output each activity in a natural language form. In some embodiments, the natural language responses may be "install a vector database," "define a data schema," "import and vectorize the data," "define database optimizations," and "maintain the database." In some embodiments, the LLM may output more detailed natural language responses. For example, rather than outputting "install a vector database," the LLM may provide a more detailed response such as "You may begin by installing a vector database, which involves downloading the necessary software and following the installation instructions provided by the vendor." Similarly, for the activity "define a data schema," the LLM may elaborate with "Next, you may need to define a data schema, which includes specifying the structure of the data and the relationships between different data elements." In some embodiments, the natural language response may include "Offering overdraft protection to customers via telecentre will involve issuing overdraft protection to interested customers via the telecentre." In some embodiments, the LLM may generate activity-related outputs using other formats.

In some embodiments, the system may generate a display showing the activities for performing the process. As an example, the system may show the activities "install a vector database," "define a data schema," "import and vectorize the data," "define database optimizations," and "maintain the database" on a display. The system may show the activity "issuance of overdraft protection to authenticated customers through a telecentre" on a display. The display may include a first set of selectable indicators corresponding to the activities. For example, each activity may be associated with a selectable indicator such that a user may interact with the display to select one or more activities. The system may then receive, via the display, a first selection of the first activity. For example, a user may select a first selectable indicator associated with the first activity.

In some embodiments, an output from the first instance of the LLM may be input into a second instance of the LLM in a cascading manner. For example, the system may input, into a second instance of the LLM, a first activity-related natural language response associated with the first activity. In some embodiments, the system may input the first activity into the second instance of the LLM. This may cause the second instance of the LLM to output one or more vulnerabilities associated with the first activity. The second instance of the LLM may be trained to predict vulnerabilities based on natural language responses relating to activities or based on the activities themselves. This training may involve exposing the LLM to a vast corpus of data that includes various activities and their associated vulnerabilities. The second instance of the LLM may be trained using any of the techniques discussed in greater detail below.

In some embodiments, an output from the first agent may be input into a second agent in a cascading manner. For example, the system may input, into a second agent, a first activity of the activities output by the first agent. This may cause the second agent to output one or more vulnerabilities associated with the first activity. The second agent may be trained to predict vulnerabilities based on activities. Training may involve exposing the second agent to a vast dataset containing various examples of activities and their corresponding vulnerabilities. This dataset may include detailed descriptions of vulnerabilities, such as those associated with "importing and vectorizing the data." The second agent may be trained using any of the techniques discussed in greater detail below. As an illustrative example, for the activity "import and vectorize the data," the second agent may output a vulnerability such as "data breach."

In some embodiments, each vulnerability of the one or more vulnerabilities may be associated with a vulnerability-related natural language response. The second instance of the LLM may output each vulnerability in a natural language form. For example, for the activity "import and vectorize the data," the LLM may output a vulnerability-related natural language response that includes "data breach." In some embodiments, the LLM may output more detailed natural language responses. For example, rather than outputting "data breach," the LLM may provide a more detailed response such as "There is a risk of a data breach during the import and vectorization process, which may occur if sensitive data is not properly secured or if unauthorized access is gained." As an example, rather than outputting "customer authentication," the LLM may provide a more detailed response such as "There is risk associated with customer authorization during the issuance of overdraft protection to authenticated customers through a telecentre." This detailed response may elaborate on the specific nature of the vulnerability and the context in which it may arise. In some embodiments, the LLM may generate vulnerability-related outputs using other formats.

In some embodiments, the second instance of the LLM may further output probabilities corresponding to the vulnerabilities for the first activity. For example, for each identified vulnerability, the LLM may assign a probability value that indicates the likelihood of that vulnerability occurring. As an illustrative example, when analyzing the activity "import and vectorize the data," the LLM may output probabilities for the risks of "data breach," "data corruption," and "unauthorized access." Each of these vulnerabilities may be associated with a specific probability, such as 0.7 for "data breach," 0.5 for "data corruption," and 0.3 for "unauthorized access." In some embodiments, the system may select a first vulnerability based on the first vulnerability being associated with the highest probability of the probabilities. For example, the system may prioritize addressing the vulnerability that is most likely to occur. If "data breach" has the highest probability, the system may select this vulnerability and focus on implementing controls and mitigation strategies to prevent data breaches. This approach may help allocate resources more effectively, as efforts may be concentrated on mitigating the highest-risk vulnerabilities.

In some embodiments, the system may select the first vulnerability based on user input. For example, the system may generate a new display or modify the display previously used to display the activities. The system may modify the display to show the one or more vulnerabilities associated with the first activity. The display may include a second set of selectable indicators corresponding to the vulnerabilities. For example, each vulnerability may be associated with a selectable indicator such that a user may interact with the display to select one or more vulnerabilities. The system may then receive, via the display, a second selection of the first vulnerability. For example, a user may select a selectable indicator associated with the first vulnerability.

In some embodiments, an output from the second instance of the LLM may be input into a third instance of the LLM in a cascading manner. For example, the system may input, into a third instance of the LLM, a first vulnerability-related natural language response associated with a first vulnerability. In some embodiments, the system may input the first vulnerability into the third instance of the LLM. In some embodiments, this may cause the third instance of the LLM to output one or more control tools for addressing the first vulnerability. As an illustrative example, control tools associated with "data breach" may include "audit logging" and "data encryption." In some embodiments, "customer authentication" may be controlled using "automated PIN authentication or customer questions." In some embodiments, each control tool may be associated with a control-related natural language response. The third instance of the LLM may output each control tool in a natural language form. For example, for the vulnerability "data breach," the LLM may output a control-related natural language response that includes "data encryption." In some embodiments, the LLM may output more detailed natural language responses. For example, rather than outputting "data encryption," the LLM may provide a more detailed response such as "To mitigate the risk of a data breach, you may implement data encryption, which involves converting sensitive data into a secure format that may only be accessed by authorized users with the decryption key." Rather than outputting "automated PIN authentication or customer questions," the LLM may provide a more detailed response such as "To mitigate the risks associated with customer authentication, you may implement automated PIN authentication or customer questions." This detailed response may outline the specific actions required to implement the control tool and the context in which it should be applied.

In some embodiments, the third instance of the LLM is trained to identify, for vulnerabilities, control tools of one or more available control tools. The system may input a prompt into the third instance of the LLM to train the third instance of the LLM. This process may train the third instance to identify, for the vulnerabilities, corresponding control tools of the one or more available control tools within the system. The prompt may indicate the control tools available to the system for addressing vulnerabilities. The training may involve exposing the LLM to a vast corpus of data that includes various vulnerabilities and control tools available to the system for mitigating the vulnerabilities. The third instance of the LLM may be trained using any of the techniques discussed in greater detail below.

In some embodiments, an output from the second agent may be input into a third agent in a cascading manner. For example, the system may input, into a third agent, a vulnerability of the vulnerabilities output by the second agent. This may cause the third agent to output one or more control tools associated with the vulnerability. The third agent may be trained to predict control tools based on vulnerabilities. Training may involve exposing the third agent to a vast dataset containing various examples of vulnerabilities and their corresponding control tools. This dataset may include detailed descriptions of control tools, such as those associated with "data breaches." The third agent may be trained using any of the techniques discussed in greater detail below. As an illustrative example, for the vulnerability "data breach," the third agent may output a control tool such as "data encryption."

In some embodiments, the third instance of the LLM may further output one or more likelihoods of success associated with the one or more control tools for the first vulnerability. For example, for each identified control tool, the LLM may assign a likelihood value that indicates the probability of the control tool successfully mitigating the vulnerability. As an illustrative example, when addressing the vulnerability "data breach," the LLM may output likelihoods of success for control tools such as "data encryption" and "access control." Each of these control tools may be associated with a specific likelihood of success, such as 0.8 for "data encryption" and 0.7 for "access control." In some embodiments, the system may select the first control tool based on the first control tool being associated with the highest likelihood of success of the likelihoods. For example, the system may prioritize implementing the control tool that is most likely to effectively mitigate the vulnerability. If "data encryption" has the highest likelihood of success, the system may select this control tool and focus on implementing data encryption measures to prevent data breaches. This approach may help allocate resources more effectively, as efforts may be concentrated on deploying the most effective control tools.

In some embodiments, the system may select a first control tool based on user input. In some embodiments, the system may modify the display previously used for vulnerabilities to show the one or more control tools for addressing the first vulnerability. In some embodiments, the system may generate a new display to show the control tools for addressing the first vulnerability. The display may include a third set of selectable indicators corresponding to the control tools. For example, each control tool may be associated with a selectable indicator such that a user may interact with the display to select one or more control tools. The system may then receive, via the display, a selection of the first control tool. For example, a user may select a selectable indicator associated with the first control tool, allowing the system to proceed with the selected control tool to address the first vulnerability.

In some embodiments, an output from the third instance of the LLM may be input into a fourth instance of the LLM in a cascading manner. For example, the system may input, into a fourth instance of the LLM, a first control-related natural language response corresponding to a first control tool of the one or more control tools. In some embodiments, the system may input the first control tool into the fourth instance of the LLM. In some embodiments, this may cause the fourth instance of the LLM to output one or more monitoring tools for monitoring the first control tool. As an illustrative example, monitoring tools associated with "data encryption" may include "encryption tool patching" and "encryption key management." A monitoring tool associated with "automated PIN authentication or customer questions" may be "manager review of call recordings." In some embodiments, each monitoring tool may be associated with a monitoring-related natural language response. The fourth instance of the LLM may be trained to identify monitoring tools for control tools. This training may involve exposing the LLM to a vast corpus of data that includes various control tools and their associated monitoring tools. The fourth instance of the LLM may be trained using any of the techniques discussed in greater detail below.

In some embodiments, an output from the third agent may be input into a fourth agent in a cascading manner. For example, the system may input, into a fourth agent, a control tool of the control tools output by the third agent. This may cause the fourth agent to output one or more monitoring tools associated with the control tool. The fourth agent may be trained to predict monitoring tools for monitoring control tools. Training may involve exposing the fourth agent to a vast dataset containing various examples of control tools and their corresponding monitoring tools. This dataset may include detailed descriptions of monitoring tools, such as those associated with "data encryption." The fourth agent may be trained using any of the techniques discussed in greater detail below. As an illustrative example, for the control tool "data encryption," the fourth agent may output a monitoring tool such as "encryption tool patching."

The fourth instance of the LLM may output each monitoring tool in a natural language form. For example, for the control tool "data encryption," the LLM may output a monitoring-related natural language response that includes "encryption tool patching." In some embodiments, the LLM may output more detailed natural language responses. For example, rather than outputting "encryption tool patching," the LLM may provide a more detailed response such as "To ensure the effectiveness of data encryption, you may implement encryption tool patching, which involves regularly updating the encryption software to protect against new vulnerabilities and threats." Rather than outputting "manager review of call recordings," the LLM may provide a more detailed response such as "To ensure the effectiveness of automated PIN authentication or customer questions, you may implement manager review of call recordings to ensure that the PIN authentication or customer questions are being properly implemented." This detailed response may outline the specific actions required to implement the monitoring tool and the context in which it should be applied.

In some embodiments, the fourth instance of the LLM may further output one or more measures of effectiveness associated with the one or more monitoring tools. For example, for each identified monitoring tool, the LLM may assign a measure of effectiveness that indicates the capability of the monitoring tool to effectively monitor the first control tool. As an illustrative example, when addressing the control tool "data encryption," the LLM may output measures of effectiveness for monitoring tools such as "encryption tool patching" and "encryption key management." Each of these monitoring tools may be associated with a specific measure of effectiveness, such as 0.85 for "encryption tool patching" and 0.75 for "encryption key management." In some embodiments, the system may select the first monitoring tool based on the first monitoring tool being associated with the highest measure of effectiveness of the measures. For example, the system may prioritize implementing the monitoring tool that is most likely to effectively monitor the control tool. If "encryption tool patching" has the highest measure of effectiveness, the system may select this monitoring tool and focus on implementing encryption tool patching measures to ensure the effectiveness of data encryption.

In some embodiments, the system may select a first monitoring tool based on user input. In some embodiments, the system may modify the display previously showing the control tools to instead show the one or more monitoring tools for monitoring the first control tool. In some embodiments, the system may generate a new display to show the monitoring tools for the first control tool. The display may include a fourth set of selectable indicators corresponding to the monitoring tools. For example, each monitoring tool may be associated with a selectable indicator such that a user may interact with the display to select one or more monitoring tools. The system may then receive, via the display, a selection of the first monitoring tool. For example, a user may select a selectable indicator associated with the first monitoring tool, allowing the system to proceed with the selected monitoring tool to ensure the effectiveness of the first control tool.

In some embodiments, the system may generate, in response to the natural language query, the first activity, the first vulnerability, the first control tool response, and the first monitoring tool. In some embodiments, the system may generate, in response to the natural language query, the first activity-related natural language response, the first vulnerability-related natural language response, the first control-related natural language response, and the first monitoring-related natural language response. For example, upon receiving a query about implementing a vector database, the system may generate an activity-related response such as "install a vector database," a vulnerability-related response such as "data breach," a control-related response such as "data encryption," and a monitoring-related response such as "encryption tool patching." Each of these responses may be tailored to address different aspects of the query, providing a comprehensive approach to managing the process. In some embodiments, in response to the natural language query, the system may generate a response such as, "To implement a vector database, you should first install the vector database, be aware of the risk of data breach, mitigate this risk by implementing data encryption, and ensure the effectiveness of this control by regularly performing encryption tool patching." As another example, in response to a natural language query regarding offering overdraft protection to authenticated customers through a telecentre, the system may generate a response such as, "To offer overdraft protection to authenticated customers through a telecentre, you will need to issue overdraft protection through the telecentre. This will involve risks associated with customer authentication, which can be mitigated using automated PIN authentication or customer questions. Automated PIN authentication or customer questions can be monitored using manager review of call recordings." In some embodiments, the system may generate outputs in other formats.

In some embodiments, the system may transmit, to a system associated with the first vulnerability, an instruction including a first indication of the first control tool and a second indication of the first monitoring tool. The instruction may additionally include implementation instructions to cause the system to implement the first control tool and the first monitoring tool according to the implementation instructions. For example, if the identified vulnerability is a data breach, the system may transmit an instruction that includes an indication of "data encryption" as the control tool and "encryption tool patching" as the monitoring tool. Additionally, the instruction may contain detailed implementation steps, such as configuring the encryption settings and scheduling regular updates for the encryption software. By transmitting these comprehensive instructions, the system ensures that the receiving system may effectively implement the necessary measures to mitigate the identified vulnerability and continuously monitor the effectiveness of these measures.

In some embodiments, the system may determine one or more confidence metrics associated with outputs from the first instance, the second instance, the third instance, and the fourth instance of the LLM. These confidence metrics may quantify the reliability and accuracy of the outputs generated by each instance of the LLM. For example, the system may evaluate the confidence metric for an output related to identifying activities, vulnerabilities, control tools, or monitoring tools. If the system determines that a confidence metric associated with an output from any of these instances falls below a predefined threshold, it may initiate a retraining process for the corresponding instance of the LLM. This retraining process may involve updating the model with additional data, refining its algorithms, or adjusting its parameters to improve its performance. This ensures that the outputs remain accurate and reliable. The retraining process may involve any of the training techniques discussed in greater detail below.

In some embodiments, various types of models may be used for the methods and systems described herein. For example, the system may utilize traditional machine learning (ML) models. These models may be designed to output predetermined responses rather than generating new responses. The process may involve prompting the model with a query, vectorizing the input data, and then mapping the input data into the vector space of the model. The model may then output the closest match from a pre-defined set of responses. This approach may be useful in scenarios where consistency and predictability of responses are critical, as it allows the system to provide reliable and accurate answers based on a fixed set of data. By leveraging different types of models, the system may be tailored to meet specific requirements and constraints.

To assist in understanding the present disclosure, some concepts relevant to neural networks and ML are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly-available text corpora may be, e.g., fine-tuned by further training using specific training samples. The specific training samples may be used to generate language in a certain style or in a certain format. For example, the ML model may be trained to generate a blog post having a particular style and structure with a given topic.

Training an agent model may involve several key steps to ensure that the agent learns to perform specialized tasks effectively. Initially, the model may be provided with a large dataset that includes various examples of the tasks it needs to learn. This dataset may be used to train the model through supervised learning, where the model is given input-output pairs and learns to map the inputs to the correct outputs. During this phase, the model may use algorithms such as gradient descent to minimize the error between its predictions and the actual outcomes. The training process may also involve reinforcement learning, where the agent interacts with an environment and learns from the consequences of its actions. In this approach, the agent may receive rewards or penalties based on its actions, which helps it learn to maximize cumulative rewards over time. The agent may use techniques such as Q-learning or policy gradients to improve its decision-making policies. Throughout the training process, the model may undergo multiple iterations, with each iteration refining its parameters to improve performance. Techniques such as cross-validation may be used to ensure that the model generalizes well to new, unseen data. Additionally, the training process may involve regularization methods to prevent overfitting and ensure that the model remains robust. Once the training is complete, the agent may be evaluated using a separate validation dataset to assess its performance. If necessary, further fine-tuning may be performed to optimize the model. The final trained agent may then be deployed to perform the desired tasks in real-world applications, continuously learning and adapting to new data and environments.

Some concepts in ML-based language models are now discussed. It may be noted that, while the term "language model" has been commonly used to refer to a ML-based language model, there may exist non-ML language models. In the present disclosure, the terms "large language generative model," "SLM," or "LLM" may be used to refer to an ML-based language model (i.e., a language model that is implemented using a neural network or other ML architecture), unless stated otherwise. For example, unless stated otherwise, the term "language model" encompasses LLMs and SLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of an LLM may contain millions or billions of learned parameters or more. As non-limiting examples, a language model may generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models may also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

LLMs may be trained on a text corpus that is labeled (e.g., annotated to indicate verbs, nouns) or unlabeled. LLMs may be trained on a large unlabeled corpus. Some LLMs may be trained on a large multi-language, multi-domain corpus to enable the model to be versatile at a variety of language-based tasks such as generative tasks (e.g., generating human-like natural language responses to natural language input). Input to a language model (whether transformer-based or otherwise) typically is in the form of natural language that may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without white space appended. In some examples, a token may correspond to a portion of a word.

Tokenization of a text sequence into tokens may be performed by some pre-processing tokenization module such as, for example, a byte-pair encoding tokenizer (the "pre" referring to the tokenization occurring prior to the processing of the tokenized input by the LLM). In general, the token sequence that is inputted to a transformer may be of any length up to a maximum length defined based on the dimensions of the transformer. Each token in the token sequence is converted into an embedding vector (also referred to simply as an embedding). An embedding is a learned numerical representation (such as, for example, a vector) of a token that captures some semantic meaning of the text segment represented by the token. The embedding represents the text segment corresponding to the token in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding corresponding to the "write" token will be closer to another embedding corresponding to the "jot down" token in the vector space as compared to the distance between the embedding corresponding to the "write" token and another embedding corresponding to the "summary" token.

The vector space may be defined by the dimensions and values of the embedding vectors. Various techniques may be used to convert a token to an embedding. For example, another trained ML model may be used to convert the token into an embedding. In particular, another trained ML model may be used to convert the token into an embedding in a way that encodes additional information into the embedding (e.g., a trained ML model may encode positional information about the position of the token in the text sequence into the embedding). In some examples, the numerical value of the token may be used to look up the corresponding embedding in an embedding matrix (which may be learned during training of the transformer).

The generated embeddings are input into a encoder. The encoder serves to encode the embeddings into feature vectors that represent the latent features of the embeddings. The encoder may encode positional information (i.e., information about the sequence of the input) in the feature vectors. The feature vectors may have very high dimensionality (e.g., on the order of thousands or tens of thousands), with each element in a feature vector corresponding to a respective feature. The numerical weight of each element in a feature vector represents the importance of the corresponding feature. The space of all possible feature vectors that may be generated by the encoder may be referred to as the latent space or feature space.

Conceptually, the decoder is designed to map the features represented by the feature vectors into meaningful output, which may depend on the task that was assigned to the transformer. For example, if the transformer is used for a translation task, the decoder may map the feature vectors into text output in a target language different from the language of the original tokens. Generally, in a generative language model, the decoder serves to decode the feature vectors into a sequence of tokens. The decoder may generate output tokens one by one. Each output token may be fed back as input to the decoder in order to generate the next output token. By feeding back the generated output and applying self-attention, the decoder is able to generate a sequence of output tokens that has sequential meaning (e.g., the resulting output text sequence is understandable as a sentence and obeys grammatical rules). The decoder may generate output tokens until a special [EOT] token (indicating the end of the text) is generated. The resulting sequence of output tokens may then be converted to a text sequence in post-processing. For example, each output token may be an integer number that corresponds to a vocabulary index. By looking up the text segment using the vocabulary index, the text segment corresponding to each output token may be retrieved, the text segments may be concatenated together, and the final output text sequence may be obtained.

In some examples, the input provided to the transformer includes instructions to perform a function on an existing text. In some examples, the input provided to the transformer includes instructions to perform a function on an existing text. The output may include, for example, a modified version of the input text and instructions to modify the text. The modification may include summarizing, translating, correcting grammar or spelling, changing the style of the input text, lengthening or shortening the text, or changing the format of the text. For example, the input may include the question "What is the weather like in Australia?" and the output may include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that may then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it may process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system may access a remote language model (e.g., a cloud-based language model), such as ChatGPT, via a software interface (e.g., an API). Additionally or alternatively, such a remote language model may be accessed via a network such as, for example, the Internet. In some implementations, such as, for example, potentially in the case of a cloud-based language model, a remote language model may be hosted by a computer system that may include a plurality of cooperating (e.g., cooperating via a network) computer systems that may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory), and providing output in a required timeframe (e.g., real time or near real time) may require the use of a plurality of processors/cooperating computing devices as discussed above.

Inputs to an LLM may be referred to as a prompt, which is a natural language input that includes instructions to the LLM to generate a desired output. A computer system may generate a prompt that is provided as input to the LLM via its API. As described above, the prompt may optionally be processed or pre-processed into a token sequence prior to being provided as input to the LLM via its API. A prompt may include one or more examples of the desired output, which provides the LLM with additional information to enable the LLM to generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

SLMs are compact versions of language models designed to understand and generate human-like text while requiring fewer computational resources. These models may be trained on large datasets but have fewer parameters compared to their larger counterparts, making them more efficient and faster to deploy. Despite their smaller size, they can still perform a variety of NLP tasks, such as text generation, translation, and summarization. SLMs may be particularly useful in applications where computational power and memory are limited, offering a balance between performance and resource efficiency.

Training SLMs may involve a series of well-defined steps to ensure that the model can understand and generate human-like text. Initially, the model may be provided with a large corpus of text data, which serves as the foundation for learning language patterns, grammar, and context. This dataset may include diverse sources such as books, articles, and websites to cover a wide range of topics and writing styles. The training process may begin with tokenization, where the text data is broken down into smaller units such as words or subwords. These tokens are then converted into numerical representations that the model can process. The model may use techniques such as word embeddings to capture the semantic meaning of words and their relationships. During training, the model may employ algorithms like stochastic gradient descent to optimize its parameters. The objective is to minimize the loss function, which measures the difference between the model's predictions and the actual text. The model may be trained using supervised learning, where it learns to predict the next word or sequence of words based on the given context. To enhance the model's performance, techniques such as regularization and dropout may be used to prevent overfitting. Additionally, the training process may involve fine-tuning, where the model is further trained on a specific subset of data to specialize in certain tasks or domains. Throughout the training, the model's performance may be evaluated using validation datasets to ensure it generalizes well to new, unseen text. Once the training is complete, the SLM may be capable of generating coherent and contextually relevant text, making it useful for various applications such as chatbots, text completion, and language translation.

Other Embodiments

Disclosed herein are systems, methods, and computer-readable media for automatic prompt (command set, instruction set) engineering, such as automatic prompt engineering in systems for AI/ML-based simulation and modeling.

Prompts can be used to enable generative AI models to generate answers to user questions. However, a technical problem emerges when AI models are applied to answer complex questions: running AI models and optimizing them to increase output accuracy becomes computationally expensive as the questions increase in complexity, particularly when the tasks articulated in a particular prompt necessitate performing recursive and/or sequential operations. For instance, an answer to a particular question might be based on a series of intermediate responses or computations. Asking a large model (e.g., a model trained on a large corpus of data and having a high number of layers and parameters) to return a response to a composite question (e.g., "please generate a list of activities associated with process component XYZ, their associated risks, and, for the associated risks, controls and monitoring strategies") can result in computationally expensive responses. Additionally, such responses can be unusable due to overfitting of the model to a particular corpus of training data. In fact, training large models to answer complex questions can become impractical because training data sets would have to become extremely large to account for permutations/combinations in data.

Discussed herein are techniques for solving these technical problems by breaking large, complex prompts into smaller, comparatively more tailored prompts that each focus on individual segments in a question chain. Automatically generated question chains enable implementation of cascading, smaller AI models that can be executed in flexibly-structured loops, sequences, or combinations of loops and sequences. The described AI models can be individually trained, which minimizes the possibility of overfitting. Accordingly, the techniques described herein can optimize the use of computational resources (e.g., memory units, processor units, networking units, and the like) needed to run the AI models. Furthermore, the techniques described herein increase model transparency, lineage/source tracking, and/or accuracy by enabling verification of intermediate model outputs.

Although, in an illustrative use case, implementations described herein relate to automatic prompt engineering in risk control systems, the techniques described herein also relate more generally to an environment where one might find it advantageous to sequence a set of AI/ML models or model execution cycles.

Turning now to an example use case involving risk control systems, consider an Activity-Risk-Control-Monitoring (A-R-C-M) chain aimed at determining activities (e.g., tasks, process units) associated with a particular technology (e.g., "cloud computing"), operation (e.g., "mobile deposit of checks"), or business process (e.g., "offboarding of an executive"). A particular activity in a set of activities can be associated with a set of risks. Risks in the set of risks can be associated with sets of risk controls. Controls in a particular set of risk controls can be associated with monitoring activities. In the A-R-C-M framework, systems can be thought of in terms of system components (e.g., front-end technologies, back-end technologies, customer-facing operations, back-office operations), and activities can be mapped to components. Using traditional systems, determining and accounting for activities and their corresponding risks and mitigators (C-M) can be time-consuming and error-prone. However, merely automating the process via an AI model would be impractical due to a high likelihood of model overfitting to training data and high computational costs.

Accordingly, as discussed herein, the disclosed computing platform decomposes the A-R-C-M process. To that end, a component risk control generator can include a set of machine learning models, an automatic prompt generator, and a model quality assessment (validator) engine. Using a set of received input items, the automatic prompt generator can generate a component activity generator prompt. A trained upstream machine learning model can generate a component activity output set, which can be used to generate a set of cascading prompts. At specific stages in the A-R-C-M chain, the prompts are designed to optimize the corresponding model's responses for a specific task (e.g., the task of generating sets of activities, risks, components, and/or monitoring operations). Using at least one command set in the set of cascading command sets, trained downstream machine learning models can generate downstream output sets. The downstream output sets can include various AI-generated items in the A-R-C-M chain. The disclosed computing platform can be configured to use the AI model outputs (items in the A-R-C-M chain) or their derivatives to generate downstream prompts.

As disclosed herein, the output sets can be validated using the model quality assessment engine, which additionally minimizes the possibility of trained model overfitting. The cascading architecture described herein enables output validation at intermediate points in the A-R-C-M chain, which increases accuracy of output and minimizes the possibility of overfitting to sets of training data while keeping the training data sets comparatively smaller (e.g., at 50 terabytes or under).

Example Embodiments of a Computing Platform for Cascading Command Set Engineering FIG. 1 shows an example computing environment 100 that includes a computing platform 110 for cascading command set engineering, in accordance with some implementations of the present technology. The computing platform 110 enables automatic creation of prompt chains for AI models, which can be generative AI models, neural networks, transformers, or other suitable models, such as the models described in relation to FIG. 3. Use cases for the computing platform 110 include generation of automatic prompt chains for sequences, loops, conversations, and other sets of computer-executable commands that may use AI models. Example use case domains include cybersecurity applications, conversational AI applications, risk control applications, financial applications, banking applications, and so forth. Example use cases include AI-augmented scenario automation, conversational AI, content retrieval, and so forth.

As shown, the computing platform 110 includes one or more units or engines, such as the command set generator 112, AI model 114, and quality assessment engine 116. As used herein, the term "engine" refers to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations as defined by parametrized functions, specific configuration settings, special-purpose code, and/or the like. The engines can generate and/or receive various electronic messages.

The engines can be accessible via one or more computer applications 120. Computer applications 120 can be included in the computing platform 110 and/or can be communicatively coupled to the computing platform 110 via a network. The computer applications 120 can interact with the various units or engines of the computing platform 110 by running computer-based commands, invoking executables, calling application programming interface (API) functions, and so forth. The computer applications 120 can be configured to execute computer operations to support various use cases described herein. For example, computer applications 120 can include risk management applications, asset management applications, project management applications, interfaces to generative AI frameworks, and so forth. In an example use case, an application 120 can include the component risk generator 220 and/or the component risk corrector 420, described further herein.

As described, the command set generator 112 can perform various prompt generation tasks. For example, the command set generator 112 can receive a natural language prompt, question, or the like. The command set generator 112 can parse from the question to extract items (e.g., tokens) from the question. The extracted items can correspond to various elements of a prompt for an AI model. These elements can include, for example, context specifiers, knowledge domain specifiers, use cases, instructions, input items or references thereto, output specifications, and so forth. The command set generator 112 can maintain a database of data sources and can access the data sources to retrieve items that map to the items extracted from questions. For example, assuming a question asks about "computer security issues", the command set generator 112 can improve the quality of the prompt (and, therefore, of expected output), to replace or qualify the "computer security issues" clause with a reference to a vulnerability database (for example, the National Vulnerability Database).

The command set generator 112 can also construct prompts or feature maps for the AI models 114, automatically cause AI models 114 to be executed, and receive additional outputs from the AI models 114. In some implementations, the command set generator 112 can specify output formats, such as blocks of text, tables, key-value pairs, and so forth. The command set generator 112 can extract values from the outputs, generate additional prompts based on the extracted values, and execute additional (downstream) AI models 114 based on the additional prompts.

To link items in sequences of prompts and AI model executions, the command set generator can maintain an in-memory and/or on-disk memory map 130, which can include user-entered data 132 (questions, corrections) and system-generated data 134 (prompts, input feature maps, output items). As the AI models 114 generate outputs, the output items can be stored as part of system-generated data 134. Chunks of various related items in memory map 130 can be linked, which enables management of complex prompt and output chains and facilitates model transparency. For example, stored intermediate outputs in prompt chains can be retained in memory maps 130 and retrieved for validation, as described further herein. Memory maps 130 can also be used to capture corrections via user-entered data 132, which enables linkage of corrections to outputs captured in system generated data 134. This enables the technical advantage of creating targeted training sets to improve performance of specific AI models 114 in sequences of AI models 114.

The computing platform 110 can enable users to review model output and provide corrections as described further herein. To that end, the quality assessment engine 116 can enable the computing platform 110 to retrieve prompts and/or model outputs from memory maps 130, visualize the prompts and/or model outputs, and capture feedback regarding the prompts and/or model outputs.

Figures 1, 2:
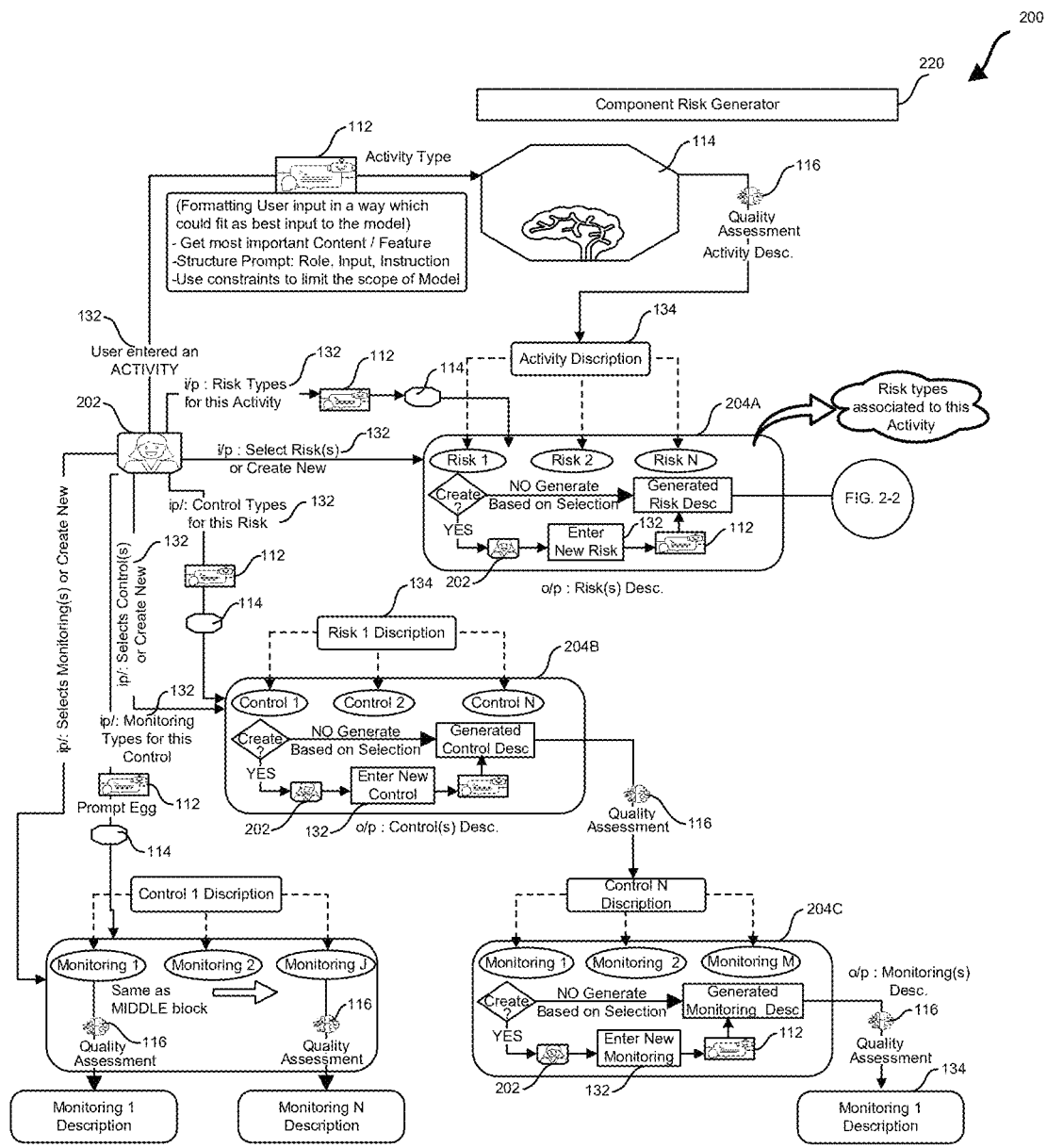
Figure 2:
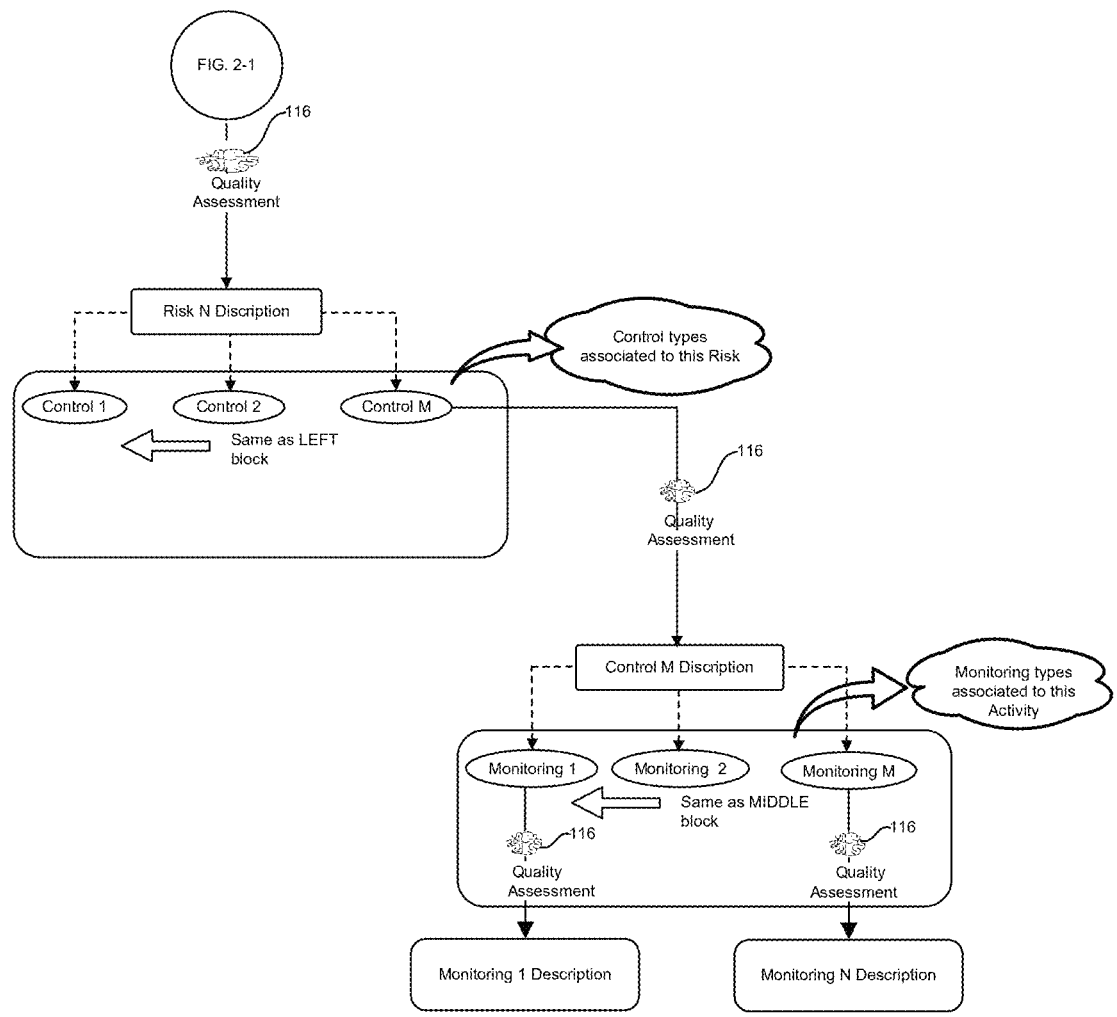

Example Embodiments of a Component Risk Generator of the Computing Platform for Cascading Command Set Engineering FIGS. 2-1 and 2-2 show an example diagram 200 of a component risk generator 220, which can operate as part of the computing platform 110 for cascading command set engineering. The component risk generator 220 can be implemented as an application 120 described in relation to FIG. 1. The component risk generator 220 can be configured to support a variety of use case domains, such as risk management, and can be operable to create complete A-R-C-M descriptions automatically and standardize the process of creating A-R-C-Ms (sets of activities, sets of risks, sets of controls, or sets of monitoring recommendations).

In an example use case, the component risk generator 220 can be configured to generate prompt sequences in A-R-C-M chains. To that end, the component risk generator 220 can include instances of the command set generator 112, AI model 114, and quality assessment engine 116. The instances of the command set generator 112 can be configured to manage the lifecycle of prompts in A-R-C-M chains (generate prompts, optimize prompts, execute prompts, manage memory maps, and so forth).

The AI models 114 can include neural networks, transformers, and/or other suitable models, such as LLMs (e.g., GPT, BERT, Llama). Generally, as shown according to a non-limiting example, the AI models 114 can be utilized to generate sets of outputs for A-R-C-M chains and/or to assess the quality of the generated outputs.

To generate sets of outputs for A-R-C-M chains, the AI models 114 can be trained AI models structured to receive feature maps sufficient to enable the AI models 114 to generate sets of activities, risks, controls, and/or monitoring operations in A-R-C-M chains. For example, an instance of the AI model 114 structured to generate activities A can be trained on elements that include use constraints (particular geographical location, region, line of business, layer in a technology stack), roles (entities responsible for specific facets of an activity), and/or activity data (e.g., company strategic plans, service offerings, service modalities, product roadmaps, product feature sets). For example, an instance of the AI model 114 structured to generate risks R can be trained on elements that include use constraints, roles, and/or risk data (e.g., risk data, fraud data, KYC (know your customer) data, system vulnerability data, reported security breach data). For example, an instance of the AI model 114 structured to generate controls C and/or monitoring M recommendations can be trained on elements that include use constraints, roles, and/or control data (e.g., procedure manuals, process manuals, best-practice guides, technology implementation guides, project management plans, program management roadmaps).

To assess the quality of the generated outputs, the AI models 114 can be trained AI models (e.g., transformer models) structured to receive feature maps sufficient to enable the AI models 114 to answer "5 W" (what, why, where, who, when) questions in order to assess the quality of output against the 5 W checkpoints. The output can include automatically generated sets of activities, risks, controls, and/or monitoring recommendations. The AI models 114 can generate outputs, metrics, and so forth, which can cause the quality assessment engine 116 to flag records for manual review, as described further herein.

In operation on the component risk generator 220, a user 202 can enter a question relating to an activity. The component risk generator 220 can generate a prompt based on the user-entered question. The component risk generator 220 can cause an AI model 114 to generate a set of activity descriptions. After being validated using the quality assessment engine 116, a particular activity description in the set of activity descriptions can (automatically or upon being selected by a user via a GUI) be used to generate a downstream prompt for another instance or iteration AI model 114, and so forth until a tree that includes a set of A-R-C-M sequences is generated. The operations for generating the R-C-M sequences can include output validation loops (204a, 204b, 204c). In the output validation loops (204a, 204b, 204c), the user 202 is enabled to review the automatically-generated R, C, or M sets and/or edit the sets as described further herein. For example, the user 202 can change, remove, or add specific risks, controls, or monitoring recommendations to the respective sets.

Example Implementations of AI/ML Models

Figure 3:
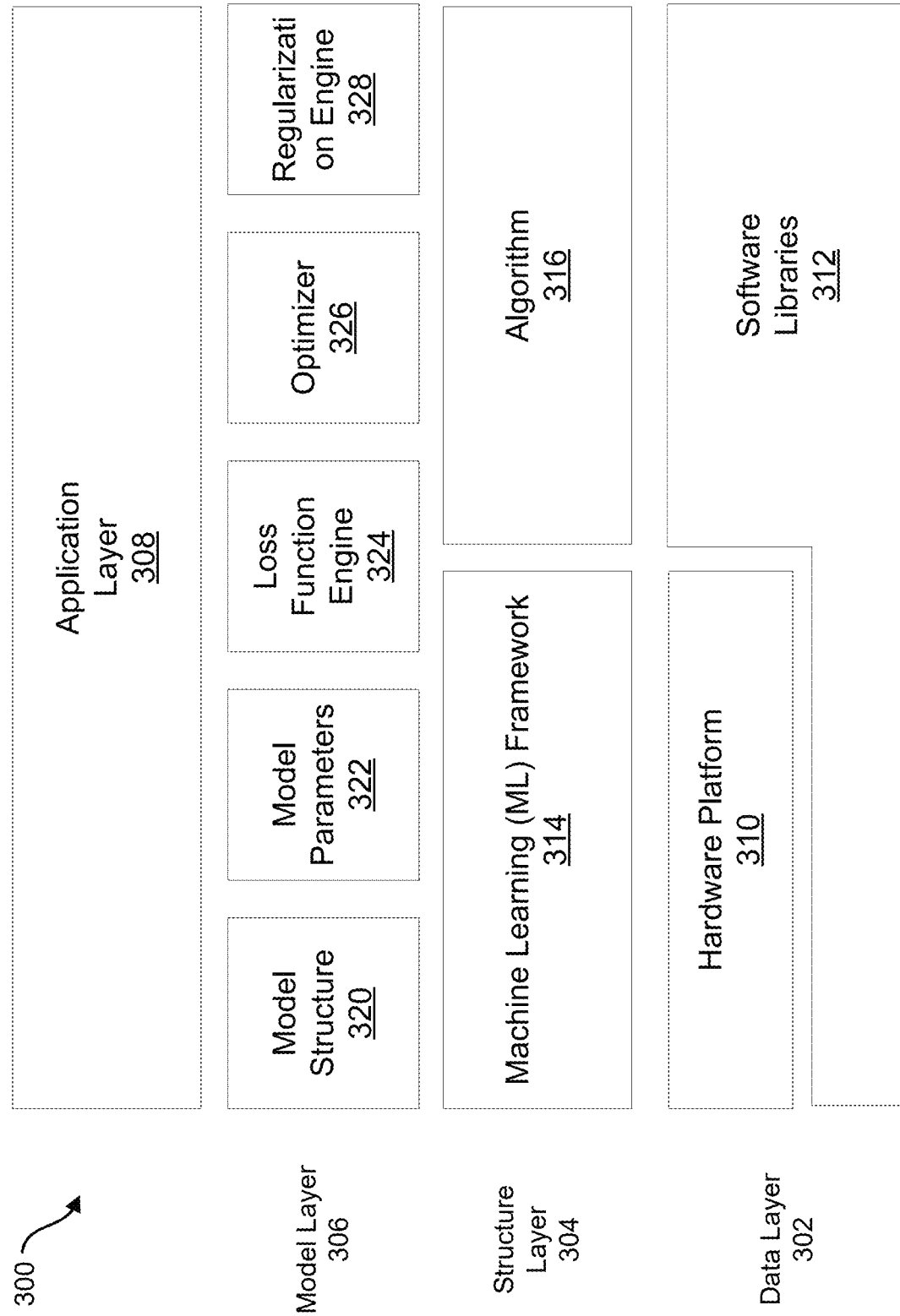
FIG. 3 illustrates a layered architecture of an artificial intelligence (AI) system that can implement the machine learning models of a computing platform for cascading command set engineering, in accordance with some implementations of the present technology.

FIG. 3 illustrates a layered architecture of an artificial intelligence (AI) system 300 that can implement the machine learning models of the computing platform 110 of FIG. 1, in accordance with some implementations of the present technology.

As shown, the AI system 300 can include a set of layers, which conceptually organize elements within an example network topology for the AI system's architecture to implement a particular AI model. Generally, an AI model is a computer-executable program implemented by the AI system 300 that analyses data to make predictions. Information can pass through each layer of the AI system 300 to generate outputs for the AI model. The layers can include a data layer 302, a structure layer 304, a model layer 306, and an application layer 308. The algorithm 316 of the structure layer 304 and the model structure 320 and model parameters 322 of the model layer 306 together form an example AI model. The optimizer 326, loss function engine 324, and regularization engine 328 work to refine and optimize the AI model, and the data layer 302 provides resources and support for application of the AI model by the application layer 308.

The data layer 302 acts as the foundation of the AI system 300 by preparing data for the AI model. As shown, the data layer 302 can include two sub-layers: a hardware platform 310 and one or more software libraries 312. The hardware platform 310 can be designed to perform operations for the AI model and include computing resources for storage, memory, logic and networking. The hardware platform 310 can process amounts of data using one or more servers. The servers can perform backend operations such as matrix calculations, parallel calculations, machine learning (ML) training, and the like. Examples of servers used by the hardware platform 310 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 310 can include Infrastructure as a Service (IaaS)

resources, which are computing resources, (e.g., servers, memory, etc.) offered by a cloud services provider. The hardware platform 310 can also include computer memory for storing data about the AI model, application of the AI model, and training data for the AI model. The computer memory can be a form of random-access memory (RAM), such as dynamic RAM, static RAM, and non-volatile RAM.

The software libraries 312 can be thought of suites of data and programming code, including executables, used to control the computing resources of the hardware platform 310. The programming code can include low-level primitives (e.g., fundamental language elements) that form the foundation of one or more low-level programming languages, such that servers of the hardware platform 310 can use the low-level primitives to carry out specific operations. The low-level programming languages do not require much, if any, abstraction from a computing resource's instruction set architecture, allowing them to run quickly with a small memory footprint. Examples of software libraries 312 that can be included in the AI system 300 include Intel Math Kernel Library, Nvidia cuDNN, Eigen, and Open BLAS.

The structure layer 304 can include an ML framework 314 and an algorithm 316. The ML framework 314 can be thought of as an interface, library, or tool that allows users to build and deploy the AI model. The ML framework 314 can include an open-source library, an application programming interface (API), a gradient-boosting library, an ensemble method, and/or a deep learning toolkit that work with the layers of the AI system facilitate development of the AI model. For example, the ML framework 314 can distribute processes for application or training of the AI model across multiple resources in the hardware platform 310. The ML framework 314 can also include a set of pre-built components that have the functionality to implement and train the AI model and allow users to use pre-built functions and classes to construct and train the AI model. Thus, the ML framework 314 can be used to facilitate data engineering, development, hyperparameter tuning, testing, and training for the AI model. Examples of ML frameworks 314 that can be used in the AI system 300 include TensorFlow, PyTorch, Scikit-Learn, Keras, Cafffe, LightGBM, Random Forest, and Amazon Web Services.

The algorithm 316 can be an organized set of computer-executable operations used to generate output data from a set of input data and can be described using pseudocode. The algorithm 316 can include complex code that allows the computing resources to learn from new input data and create new/modified outputs based on what was learned. In some implementations, the algorithm 316 can build the AI model through being trained while running computing resources of the hardware platform 310. This training allows the algorithm 316 to make predictions or decisions without being explicitly programmed to do so. Once trained, the algorithm 316 can run at the computing resources as part of the AI model to make predictions or decisions, improve computing resource performance, or perform tasks. The algorithm 316 can be trained using supervised learning, unsupervised learning, semi-supervised learning, and/or reinforcement learning.

Using supervised learning, the algorithm 316 can be trained to learn patterns (e.g., map input data to output data) based on labeled training data. The training data may be labeled by an external user or operator. The user may label the training data based on one or more classes (e.g., use constrains, activity categories, risk categories, control categories, monitoring categories) and trains the AI model by inputting the training data to the algorithm 316. The algorithm determines how to label the new data based on the labeled training data. The user can facilitate collection, labeling, and/or input via the ML framework 314. In some instances, the user may convert the training data to a set of feature vectors for input to the algorithm 316. Once trained, the user can test the algorithm 316 on new data to determine if the algorithm 316 is predicting accurate labels for the new data. For example, the user can use cross-validation methods to test the accuracy of the algorithm 316 and retrain the algorithm 316 on new training data if the results of the cross-validation are below an accuracy threshold.

Supervised learning can involve classification and/or regression. Classification techniques involve teaching the algorithm 316 to identify a category of new observations based on training data and are used when input data for the algorithm 316 is discrete. Said differently, when learning through classification techniques, the algorithm 316 receives training data labeled with categories (e.g., classes) and determines how features observed in the training data relate to the categories. Once trained, the algorithm 316 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 316 is continuous. Regression techniques can be used to train the algorithm 316 to predict or forecast relationships between variables. To train the algorithm 316 using regression techniques, a user can select a regression method for estimating the parameters of the model. The user collects and labels training data that is input to the algorithm 316 such that the algorithm 316 is trained to understand the relationship between data features and the dependent variable(s). Once trained, the algorithm 316 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 316 learns patterns from unlabeled training data. In particular, the algorithm 316 is trained to learn hidden patterns and insights of input data, which can be used for data exploration or for generating new data. Here, the algorithm 316 does not have a predefined output, unlike the labels output when the algorithm 316 is trained using supervised learning. Said another way, unsupervised learning is used to train the algorithm 316 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 316 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 316 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 316 include factor analysis, item response theory, latent profile analysis, and latent class analysis.

The model layer 306 implements the AI model using data from the data layer and the algorithm 316 and ML framework 314 from the structure layer 304, thus enabling decision-making capabilities of the AI system 300. The model layer 306 includes a model structure 320, model parameters 322, a loss function engine 324, an optimizer 326, and a regularization engine 328.

The model structure 320 describes the architecture of the AI model of the AI system 300. The model structure 320 defines the complexity of the pattern/relationship that the AI model expresses. Examples of structures that can be used as the model structure 320 include decision trees, support vector machines, regression analyses, Bayesian networks, Gaussian processes, genetic algorithms, and artificial neural networks (or, simply, neural networks). The model structure 320 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 320 may include one or more hidden layers of nodes between the input and output layers. The model structure 320 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 322 represent the relationships learned during training and can be used to make predictions and decisions based on input data. The model parameters 322 can weight and bias the nodes and connections of the model structure 320. For instance, when the model structure 320 is a neural network, the model parameters 322 can weight and bias the nodes in each layer of the neural networks, such that the weights determine the strength of the nodes and the biases determine the thresholds for the activation functions of each node. The model parameters 322, in conjunction with the activation functions of the nodes, determine how input data is transformed into desired outputs. The model parameters 322 can be determined and/or altered during training of the algorithm 316.

The loss function engine 324 can determine a loss function, which is a metric used to evaluate the AI model's performance during training. For instance, the loss function engine 324 can measure the difference between a predicted output of the AI model and the actual output of the AI model and is used to guide optimization of the AI model during training to minimize the loss function. The loss function may be presented via the ML framework 314, such that a user can determine whether to retrain or otherwise alter the algorithm 316 if the loss function is over a threshold. In some instances, the algorithm 316 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 326 adjusts the model parameters 322 to minimize the loss function during training of the algorithm 316. In other words, the optimizer 326 uses the loss function generated by the loss function engine 324 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 326 used may be determined based on the type of model structure 320 and the size of data and the computing resources available in the data layer 302.

The regularization engine 328 executes regularization operations. Regularization is a technique that prevents over- and under-fitting of the AI model. Overfitting occurs when the algorithm 316 is overly complex and too adapted to the training data, which can result in poor performance of the AI model. Underfitting occurs when the algorithm 316 is unable to recognize even basic patterns from the training data such that it cannot perform well on training data or on validation data. The optimizer 326 can apply one or more regularization techniques to fit the algorithm 316 to the training data properly, which helps constraint the resulting AI model and improves its ability for generalized application. Examples of regularization techniques include lasso (L1) regularization, ridge (L2) regularization, and elastic (L1 and L2 regularization).

The application layer 308 describes how the AI system 300 is used to solve problem or perform tasks. In an example implementation, the application layer 308 can include application(s) 120 of the computing platform 110 of FIG. 1.

Example Embodiments of a Component Risk Corrector of the Computing Platform for Cascading Command Set Engineering FIGS. 4A, 4B-1 and 4B-2 show an example architecture 400 and GUI 450 of a component risk corrector 420, which can operate as part of the computing platform 110 described in relation to FIG. 1. The component risk corrector 420 can be implemented as an application 120 described in relation to FIG. 1 and can be operable to correct a faulty A-R-C-M chain by generating suggested missing information and facilitating user acceptance. Furthermore, the component risk corrector 420 can check the quality of AI-generated and/or user-entered A-R-C-Ms by executing a trained AI model to perform a 5 W check on the generated activities, risks, controls, and/or monitoring recommendations.

In operation of the component risk corrector 420, system-generated data 134 (for example, activity data, risk data, control data, monitoring data) can be provided to the quality assessment engine 116, which can cause a trained first instance of an AI model 114 to be executed on the system-generated data 134. The output of the AI model 114 can enable the quality assessment engine 116 to flag (at 422) various missing items, such as line of business, author, and so forth. The flagged data can be provided, via a GUI, to the user who can manually correct (at 424) the ARCM element and add (at 426) a disposition annotation. The manually corrected and annotated unit of system-generated data 134 can be provided (at 436) to the command set generator 112, which can generate (at 428) the additional related items in the A-R-C-M chain. The user 430 can evaluate the additional items. If, at decisional 432, the user determines that answers are not correct, the user can manually update (at 434) the corresponding A-R-C-M sets, which can be used (at 436) for reinforcement learning of the AI model 114 that generated (at 428) the additional related items in the A-R-C-M chain. If, at decisional 432, the user determines that answers are correct, the items can be provided (at 440) to a trained AI model 114 to perform a further quality assessment.

Figure 4A:
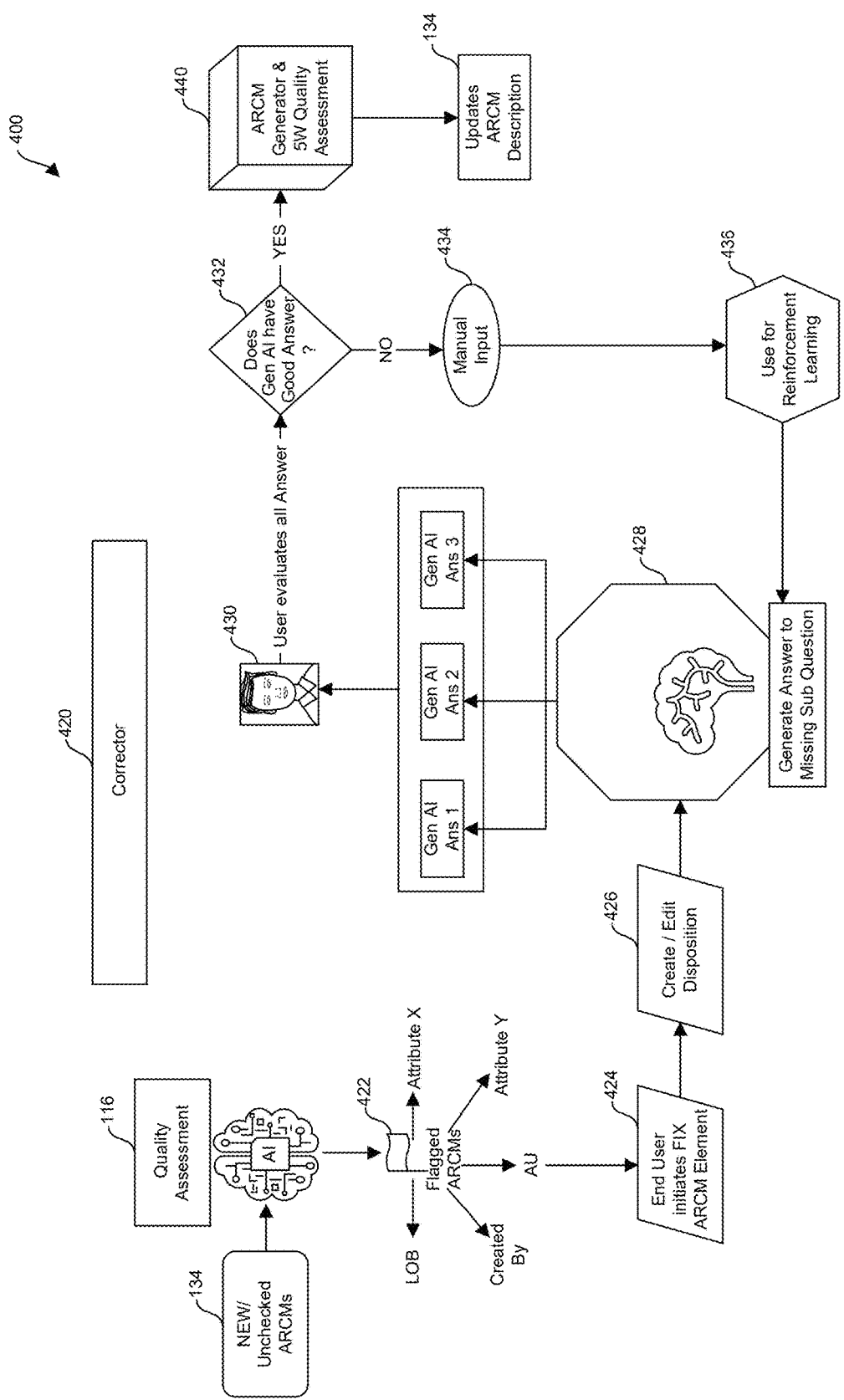
Figures 1, 4B:
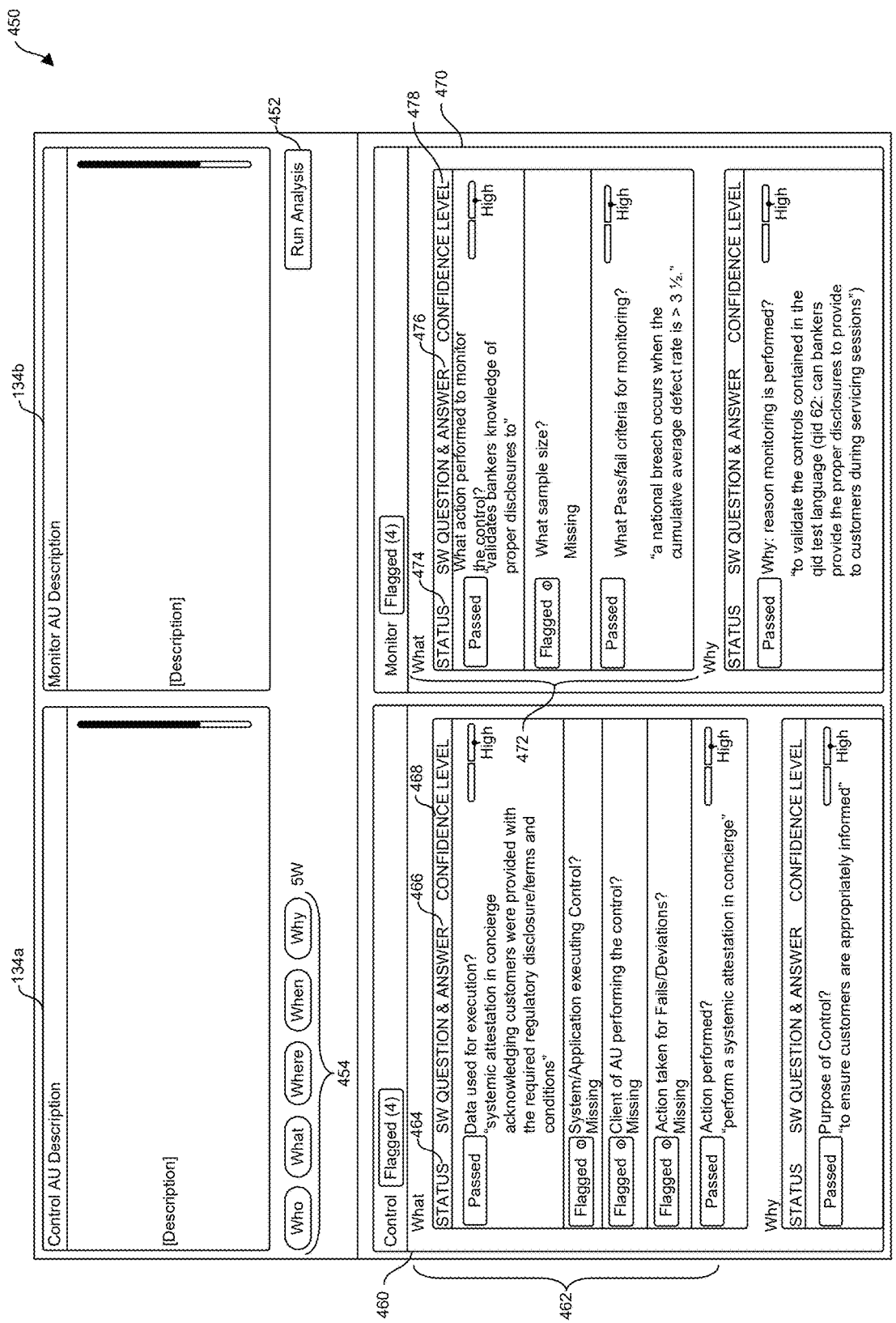
Figures 2, 4B:
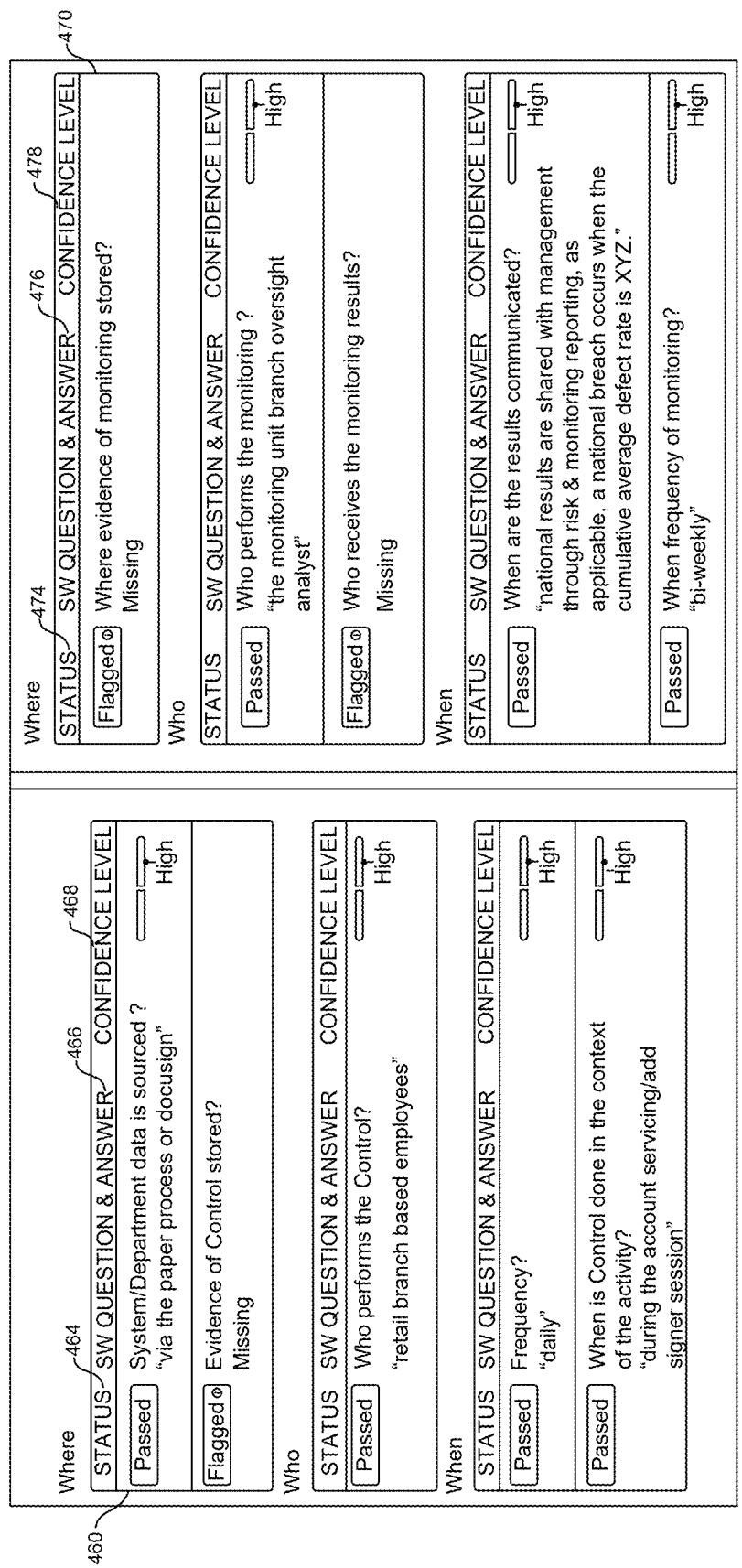

A further quality assessment can include a 5 W check, as shown in FIGS. 4B-1 and 4B-2. For instance, the component risk corrector 420 can provide the items (134a, 134b) to a trained transformer model. Upon receiving a user instruction to run analytics (at 452), the model can perform a 5 W assessment (at 454) to evaluate the item (134a, 134b) against a set of 5 W checkpoints. The output of the model can be used by the component risk corrector 420 to generate output panels (460, 470) and populate a test status (464, 474) (e.g., passed, failed, flagged), a description (466, 476) relating to the test status (464, 474), and/or a confidence metric (468, 478) relating to the test status (464, 474). The confidence metric can be a value selected from a range of values (e.g., 1-10, 1-100, 0.0-1.0) and can have a suitable form factor, which can include alphanumeric data (e.g., a numerical score, a letter score) and/or a visual indicator relating to the test status and/or the score (e.g., a slider, a scale).

Example Methods of Operation

Figure 5:
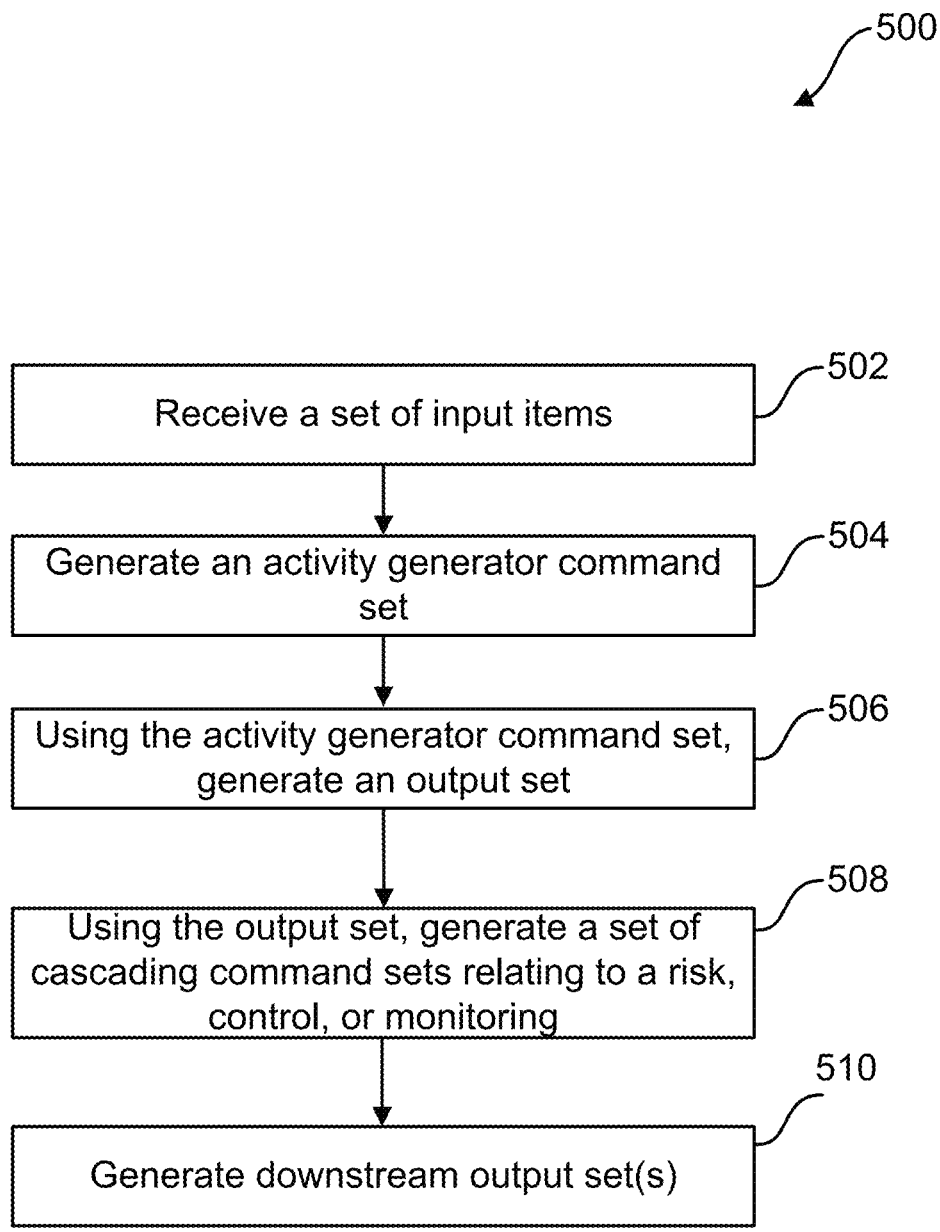
FIG. 5 is a flowchart depicting an example method of operation of the computing platform of FIG. 1, in accordance with some implementations of the present technology.

FIG. 5 is a flowchart depicting an example method 500 of operation of the computing platform of FIG. 1, in accordance with some implementations of the present technology. As a general overview, variations of method 500 can include computer-based operations of various components of the computing platform 110, such as application(s) 120. Application(s) 120 can include the component risk generator 220 and the component risk corrector 420. For example, the component risk generator 220 can receive (via a GUI for an executable application, browser-based application, applet, plug-in, chatbot, and so forth) input items. The component risk generator 220 can use information generated based on the input items to automatically generate a prompt (command set) for an AI model.

For example, an automatically generated prompt can be structured to cause the model to generate a list of likely activities associated with a particular system or process component. The prompt can be executed to generate an activity output set that includes a set of activities. The activity output set can be used to generate another prompt, which can be structured to operate on items from the activity output set to return the corresponding risks, controls, and monitoring items for activities in the activity output set. These items can be quality-checked by the component risk corrector 420, which can apply AI model(s) to generate quality metrics, such as test statuses, descriptions, and/or confidence metrics.

Computer-based method 500 enables a host of technical advantages. For example, performing operations to recursively generate sets of activities and their corresponding risks, controls, and monitoring can be error-prone and time-consuming. Automatic, cascading prompt engineering and prompt/model chaining enables prompt and model tuning operations, which can improve the output quality of the AI models that generate the outputs described herein. For example, running AI models becomes more computationally expensive as prompts increase in complexity, particularly when the tasks articulated in a particular prompt necessitate performing recursive operations. Additionally, asking a large model (e.g., a model trained on a comparatively larger corpus of data and having a comparatively higher number of layers and parameters) to return a response to a composite question can result in computationally expensive responses, which can also be unusable due to overfitting to a particular corpus of training data. Breaking large, complex prompts into smaller, comparatively more tailored, prompts that focus on individual segments in the A-R-C-M chain can enable implementation of cascading, smaller AI models. These AI models can be individually trained, which minimizes the possibility of overfitting, optimizes the use of computational resources needed to run the models, and increases transparency when verifying model outputs.

In operation of the computing platform 110, at step 502, the component risk generator 220 can receive a set of input items. The set of input items can include, for example, a user-supplied question, such as "What are the activities, risks, controls, and monitors associated with implementing a vector database?"

Example activities can include, for example, "install a vector database", "define a data schema", "import and vectorize the data", "define database optimizations", and "maintain the database." Activities in a set of activities can be associated with a set of risks. For instance, "import and vectorize the data" and "maintain the database" activities can be associated with a risk of "data breach". Two example controls associated with "data breach" can include, for example, "audit logging" and "data encryption". An example monitoring operation associated with "audit logging" vector databases can include "CRUD [create, retrieve, update, delete] operation timestamping". Another example monitoring operation can include, for example, "encryption tool patching".

The component risk generator 220 can parse the user-supplied question to extract or generate various input items in order to generate (at step 504) a prompt. For example, a prompt can be or include an activity generator command set, such as a use constraint, a role item, an input item, and/or an instruction. For example, tokens in the user-supplied question can map to prompt elements. For example, a use constraint item "vector database" can map to a particular knowledge domain, such as "technology risk" (in a set of domains including "technology risk", "operational risk", and "process risk"). As another example, a use constraint token extracted or generated based on the user-supplied question can map to a particular geographical location, region, line of business, layer in a technology stack, and so forth. As another example, a role token can map to a particular entity responsible for a facet of activity or risk (e.g., a department within an organization, such as "Accounting", "Technology", "Compliance"). As another example, a model input item can map to another item on which the relevant model was previously trained (e.g., risk data, fraud data, KYC (know your customer) data, system vulnerability data, reported security breach data). For instance, the model input item can be used to increase prompt specificity and thereby improve the quality of model output.

More generally, generating input items for a prompt can include performing pre-processing operations on a portion of the user-supplied question. The pre-processing operations can include cross-referencing a data store (policy store, account store, system configuration information, operational database, administrative database), cross-referencing a user directory, truncating an extracted value, and/or generating a derivative value based on the extracted value. Generating a derivative value can include, for example, cross-referencing an ontology, which can generalize items (e.g., map "New York" to "Northeast"), classify items (e.g., map "vector database" to "storage"), and/or supply synonyms to improve efficiency of the prompt and to more closely match the data on which AI models are trained (e.g., for instruction items, transform "what is" to "define", "what are" to "generate a list").

At step 506, the component risk generator 220 can utilize the activity generator prompt to execute an upstream AI model, such as a transformer model or another neural network model. The automatically generated activity generator prompt can be optimized to correspond to features in the corpus of training data on which the upstream AI model was previously trained (e.g., use constraint, role item, model input item, instruction). The AI model can generate an activity output set, such as "install a vector database", "define a data schema", "import and vectorize the data", "define database optimizations", and "maintain the database."

At step 508, a series of downstream prompts in the A-R-C-M chain can be constructed and the corresponding downstream AI models can be executed, based on the downstream prompts, in a cascading manner. The downstream AI models generate, at step 510, downstream output items. For example, for a particular activity $A_1$ in activity set A, the component risk generator 220 can generate a set of risks, R, which can include risk items $R_1$ through $R_n$. For a particular risk $R_1$, the component risk generator 220 can generate a set of controls, C, which can include control items $C_1$ through Cn. For a particular control $C_1$, the component risk generator 220 can generate a set of monitoring operations, M, which can include monitoring items $M_1$ through $M_n$. In some implementations, a derivative can be generated based on the output item—for example, the output item can be replaced with a synonym or ontology item that matches more closely the training corpus on which a particular downstream model was trained.

These operations can be performed by generating a downstream prompt that includes an appropriate item (e.g., risk item, control item, monitoring item). The item can be generated based on an item included in the output set of the respective upstream AI model in the A-R-C-M chain. In some implementations, the output item is taken as-is. In some implementations, the output item is post-processed—for example, the output item can be automatically validated. As another example, the output can be manually validated (e.g., by being routed to the component risk corrector 420). For example, the computing platform 110 can generate a GUI that enables users to enter additional tokens for any of the items in the A-R-C-M chain. For example, users can manually enter additional activities, risks, controls, and/or monitoring operations, and the computing platform 110 can generate additional downstream elements in the A-R-C-M chain using the manual entries. Generating additional downstream elements can include generating additional ("next") cascading command sets for the corresponding downstream AI models and additional ("next", "subsequent") output items to be included in (e.g., programmatically associated with via a binding) the model-generated output sets. In some implementations, additional data supplied by the users manually via the component risk corrector 420 can be stored as part of training sets for the AI models. Accordingly, the AI models in the A-R-C-M chain can continue to be fine-tuned to ensure that models continue to adapt to changing environments.

For brevity, operations 502-510 of method 500 have been described as a sequence. One of skill will appreciate that these operations can be performed as parallel sequences 506-508-510, 508-510, or the like.

Example Computing Environment

Figure 6:
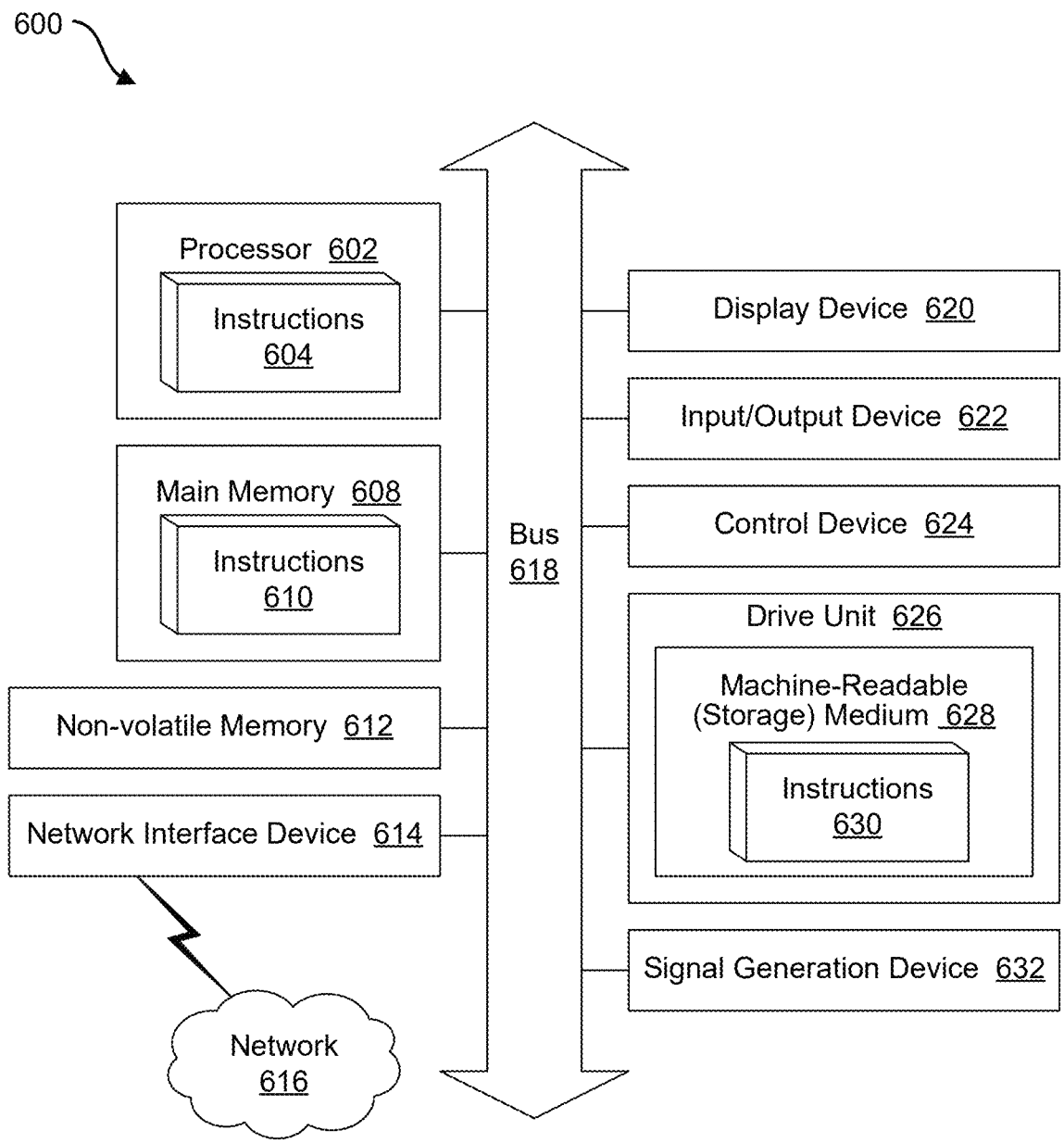
FIG. 6 is a block diagram showing some of the components typically incorporated in at least some of the computer systems and other devices on which the computing platform operates in accordance with some implementations of the present technology.

FIG. 6 is a block diagram showing some of the components typically incorporated in at least some of the computer systems and other devices 600 on which the disclosed system operates in accordance with some implementations of the present technology. As shown, an example computer system 600 can include: one or more processors 602, main memory 608, non-volatile memory 610, a network interface device 614, video display device 620, an input/output device 622, a control device 624 (e.g., keyboard and pointing device), a drive unit 626 that includes a machine-readable medium 628, and a signal generation device 632 that are communicatively connected to a bus 618. The bus 618 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 614 enables the computer system 600 to exchange data in a network 616 with an entity that is external to the computing system 600 through any communication protocol supported by the computer system 600 and the external entity. Examples of the network interface device 614 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 608, non-volatile memory 612, machine-readable medium 628) can be local, remote, or distributed. Although shown as a single medium, the machine-readable medium 628 can include multiple media (e.g., a centralized/distributed database and/or associated caches and servers) that store one or more sets of instructions 630. The machine-readable (storage) medium 628 can include any medium that is capable of storing, encoding, or carrying a set of instructions for execution by the computer system 600. The machine-readable medium 628 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 610, 630) set at various times in various memory and storage devices in computing device(s). When read and executed by the processor 602, the instruction(s) cause the computer system 600 to perform operations to execute elements involving the various aspects of the disclosure.

Figure 7:
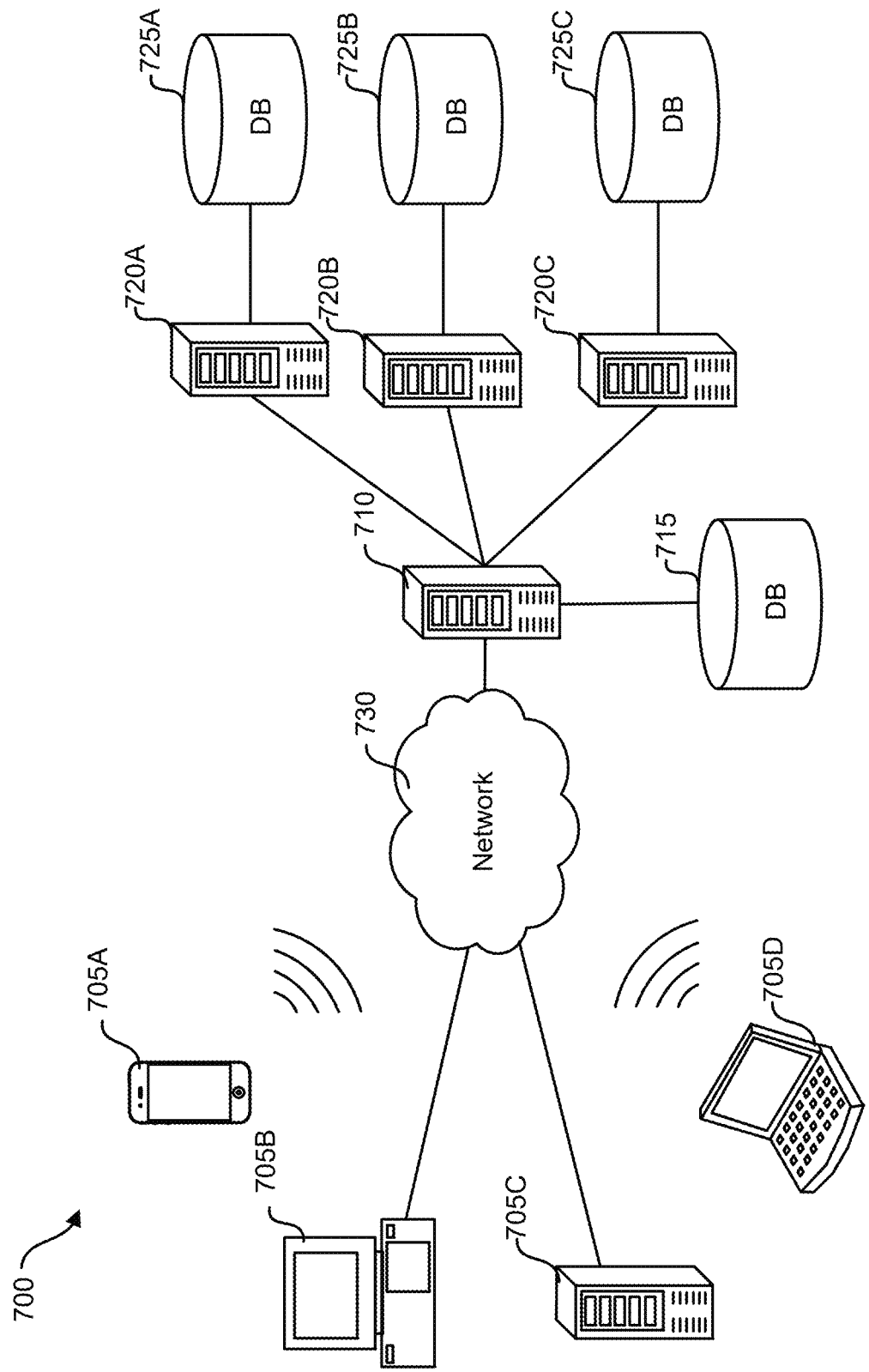
FIG. 7 is a system diagram illustrating an example of a computing environment in which the computing platform operates in some implementations of the present technology.

FIG. 7 is a system diagram illustrating an example of a computing environment in which the disclosed system operates in some implementations. In some implementations, environment 700 includes one or more client computing devices 705A-D, examples of which can host the computing platform 110 of FIG. 1. Client computing devices 705 operate in a networked environment using logical connections through network 730 to one or more remote computers, such as a server computing device.

In some implementations, server 710 is an edge server which receives client requests and coordinates fulfillment of those requests through other servers, such as servers 720A-C. In some implementations, server computing devices 710 and 720 comprise computing systems, such as the computing platform 110 of FIG. 1. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server or client devices. In some implementations, servers (710, 720A-C) connect to a corresponding database (715, 725A-C). As discussed above, each server 720 can correspond to a group of servers, and each of these servers can share a database or can have its own database. Databases 715 and 725 warehouse (e.g., store) information. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. In some implementations, network 730 is the Internet or some other public or private network. Client computing devices 705 are connected to network 730 through a network interface, such as by wired or wireless communication. While the connections between server 710 and servers 720 are shown as separate connections, these connections can be any kind of local, wide area, wired, or wireless network, including network 730 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A system for applying cascading machine learning models to command prompts, the system comprising:
   a storage device; and
   one or more processors communicatively coupled to the storage device storing instructions thereon, that cause the one or more processors to:
   receive a natural language query indicating a computing process to be performed;
   generate, based on the natural language query, a command prompt for a first instance of a large language generative model, wherein the command prompt instructs the first instance of the large language generative model to output a plurality of activities for performing the computing process;
   input, into the first instance of the large language generative model, the command prompt to cause the first instance of the large language generative model to output the plurality of activities associated with the computing process, wherein each activity of the plurality of activities comprises an activity-related natural language response, wherein the first instance of the large language generative model is trained to predict activities based on natural language queries, and wherein the large language generative model (i) extracts one or more items from inputs to the large language generative model, (ii) retrieves data from one or more data sources based on the one or more items, and (ii) generates outputs based on the data;
   input, into a second instance of the large language generative model, a first activity-related natural language response associated with a first activity of the plurality of activities to cause the second instance of the large language generative model to output a plurality of vulnerabilities associated with the first activity, wherein each vulnerability of the plurality of vulnerabilities comprises a vulnerability-related natural language response, and wherein the second instance of the large language generative model is trained to predict vulnerabilities based on activities;
   input, into a third instance of the large language generative model, a first vulnerability-related natural language response associated with a first vulnerability of the plurality of vulnerabilities to cause the third instance of the large language generative model to output one or more control tools for addressing the first vulnerability, wherein each control tool of the one or more control tools comprises a control-related natural language response, and wherein the third instance of the large language generative model is trained to identify, for vulnerabilities, control tools of a plurality of available control tools;
   input, into a fourth instance of the large language generative model, a first control-related natural language response corresponding to a first control tool of the one or more control tools to cause the fourth instance of the large language generative model to output one or more monitoring tools for monitoring the first control tool, wherein each monitoring tool of the one or more monitoring tools comprises a monitoring-related natural language response, and wherein the fourth instance of the large language generative model is trained to identify monitoring tools for control tools; and
   in response to the natural language query, generate for display the first activity-related natural language response, the first vulnerability-related natural language response, the first control-related natural language response, and a first monitoring-related natural language response corresponding to a first monitoring tool of the one or more monitoring tools.

2. The system of claim 1, wherein the second instance of the large language generative model further outputs a plurality of probabilities corresponding to the plurality of vulnerabilities for the first activity, and wherein the instructions further cause the one or more processors to select the first vulnerability based on the first vulnerability being associated with a highest probability of the plurality of probabilities.

3. The system of claim 1, wherein the third instance of the large language generative model further outputs a plurality of likelihoods of success associated with the one or more control tools for the first vulnerability, and wherein the instructions further cause the one or more processors to select the first control tool based on the first control tool being associated with a highest likelihood of success of the plurality of likelihoods.

4. The system of claim 1, wherein the fourth instance of the large language generative model further outputs a plurality of measures of effectiveness associated with the one or more monitoring tools, the plurality of measures of effectiveness indicating effectiveness of each monitoring tool of the one or more monitoring tools at monitoring the first control tool, and wherein the instructions further cause the one or more processors to select the first monitoring tool based on the first monitoring tool being associated with a highest measure of effectiveness of the plurality of measures of effectiveness.

5. The system of claim 1, wherein the instructions further cause the one or more processors to input, into the third instance of the large language generative model, a prompt to train the third instance of the large language generative model to identify, for the vulnerabilities, corresponding control tools of the plurality of available control tools, wherein the prompt indicates the plurality of available control tools for addressing vulnerabilities.

6. The system of claim 1, wherein the instructions further cause the one or more processors to transmit, to a system associated with the first vulnerability, an instruction comprising (i) a first indication of the first control tool and a second indication of the first monitoring tool and (ii) implementation instructions to cause the system to implement the first control tool and the first monitoring tool according to the implementation instructions.

7. The system of claim 1, wherein the instructions further cause the one or more processors to:
generate a display showing the plurality of activities for performing the computing process, wherein the display includes first selectable indicators corresponding to the plurality of activities;
receive, via the display, a first selection of the first activity of the plurality of activities;
modify the display to show the plurality of vulnerabilities associated with the first activity, wherein the display includes second selectable indicators corresponding to the plurality of vulnerabilities;
receive, via the display, a second selection of the first vulnerability of the plurality of vulnerabilities;
modify the display to show the one or more control tools for addressing the first vulnerability, wherein the display includes third selectable indicators corresponding to the one or more control tools;
receive, via the display, a third selection of the first control tool of the one or more control tools;
modify the display to show the one or more monitoring tools for monitoring the first control tool, wherein the display includes fourth selectable indicators corresponding to the one or more monitoring tools; and
receive, via the display, a fourth selection of the first monitoring tool of the one or more monitoring tools.

8. The system of claim 1, wherein the instructions further cause the one or more processors to:
determine a plurality of confidence metrics associated with outputs from the first instance, the second instance, the third instance, and the fourth instance of the large language generative model;
determine that a confidence metric associated with an output from the first instance, the second instance, the third instance, or the fourth instance of the large language generative model falls below a threshold; and
retrain a corresponding instance of the large language generative model for which the confidence metric falls below the threshold.

9. A method comprising:
receiving a natural language query indicating a computing process to be performed;
inputting, into a first instance of a large language generative model, a command prompt instructing the first instance of the large language generative model to output one or more activities for performing the computing process to cause the first instance of the large language generative model to output the one or more activities for performing the computing process, wherein the first instance of the large language generative model is trained to predict activities based on natural language queries, and wherein the large language generative model (i) extracts one or more items from inputs to the large language generative model, (ii) retrieves data from one or more data sources based on the one or more items, and (ii) generates outputs based on the data;
inputting, into a second instance of the large language generative model, a first activity of the one or more activities to cause the second instance of the large language generative model to output one or more vulnerabilities associated with the first activity, wherein the second instance of the large language generative model is trained to predict vulnerabilities based on activities;
inputting, into a third instance of the large language generative model, a first vulnerability of the one or more vulnerabilities to cause the third instance of the large language generative model to output one or more indications of one or more control tools for addressing the first vulnerability, wherein the third instance of the large language generative model is trained to identify, for vulnerabilities, control tools of one or more available control tools;
inputting, into a fourth instance of the large language generative model, a first control tool of the one or more control tools to cause the fourth instance of the large language generative model to output one or more indications of one or more monitoring tools for monitoring the first control tool, wherein the fourth instance of the large language generative model is trained to identify monitoring tools for control tools; and
in response to the natural language query, transmitting, to a system associated with the first vulnerability, an instruction comprising (i) a first indication of the first control tool and a second indication of a first monitoring tool and (ii) implementation instructions to cause the system to implement the first control tool and the first monitoring tool according to the implementation instructions.

10. The method of claim 9, wherein the second instance of the large language generative model further outputs one or more probabilities corresponding to the one or more vulnerabilities for the first activity, further comprising selecting the first vulnerability based on the first vulnerability being associated with a highest probability of the one or more probabilities.

11. The method of claim 9, wherein the third instance of the large language generative model further outputs one or more likelihoods of success associated with the one or more control tools for the first vulnerability, further comprising selecting the first control tool based on the first control tool being associated with a highest likelihood of success of the one or more likelihoods.

12. The method of claim 9, wherein the fourth instance of the large language generative model further outputs one or more measures of effectiveness associated with the one or more monitoring tools, the one or more measures of effectiveness indicating effectiveness of each monitoring tool of the one or more monitoring tools at monitoring the first control tool, further comprising selecting a first monitoring tool of the one or more monitoring tools based on the first monitoring tool being associated with a highest measure of effectiveness of the one or more measures of effectiveness.

13. The method of claim 9, further comprising inputting, into the third instance of the large language generative model, a prompt to train the third instance of the large language generative model to identify, for the vulnerabilities, corresponding control tools of the one or more available control tools, wherein the prompt indicates the one or more available control tools for addressing vulnerabilities.

14. The method of claim 9, further comprising:
generating a display showing the one or more activities for performing the computing process, wherein the display includes first selectable indicators corresponding to the one or more activities;
receiving, via the display, a first selection of the first activity of the one or more activities;
modifying the display to show the one or more vulnerabilities associated with the first activity, wherein the display includes second selectable indicators corresponding to the one or more vulnerabilities;
receiving, via the display, a second selection of the first vulnerability of the one or more vulnerabilities;
modifying the display to show the one or more control tools for addressing the first vulnerability, wherein the display includes third selectable indicators corresponding to the one or more control tools;
receiving, via the display, a third selection of the first control tool of the one or more control tools;
modifying the display to show the one or more monitoring tools for monitoring the first control tool, wherein the display includes fourth selectable indicators corresponding to the one or more monitoring tools; and
receiving, via the display, a fourth selection of the first monitoring tool of the one or more monitoring tools.

15. One or more non-transitory, computer-readable media storing instructions that, when executed by one or more processors, cause operations comprising:
receiving a natural language query indicating a computing process to be performed;
inputting, into a first instance of a large language generative model, a command prompt instructing the first instance of the large language generative model to output one or more activities for performing the computing process to cause the first instance of the large language generative model to output the one or more activities for performing the computing process, wherein the first instance of the large language generative model is trained to predict activities based on natural language queries, and wherein the large language generative model (i) extracts one or more items from inputs to the large language generative model, (ii) retrieves data from one or more data sources based on the one or more items, and (ii) generates outputs based on the data;
generating a display showing the one or more activities for performing the computing process, wherein the display includes first selectable indicators corresponding to the one or more activities;
receiving, via the display, a first selection of a first activity of the one or more activities;
inputting, into a second instance of the large language generative model, the first activity of the one or more activities to cause the second instance of the large language generative model to output one or more vulnerabilities associated with the first activity, wherein the second instance of the large language generative model is trained to predict vulnerabilities based on activities;
modifying the display to show the one or more vulnerabilities associated with the first activity, wherein the display includes second selectable indicators corresponding to the one or more vulnerabilities;
receiving, via the display, a second selection of a first vulnerability of the one or more vulnerabilities;
inputting, into a third instance of the large language generative model, the first vulnerability of the one or more vulnerabilities to cause the third instance of the large language generative model to output one or more indications of one or more control tools for addressing the first vulnerability, wherein the third instance of the large language generative model is trained to identify, for vulnerabilities, control tools of one or more available control tools;
modifying the display to show the one or more control tools for addressing the first vulnerability, wherein the display includes third selectable indicators corresponding to the one or more control tools;
receiving, via the display, a third selection of a first control tool of the one or more control tools;
inputting, into a fourth instance of the large language generative model, the first control tool of the one or more control tools to cause the fourth instance of the large language generative model to output one or more indications of one or more monitoring tools for monitoring the first control tool, wherein the fourth instance of the large language generative model is trained to identify monitoring tools for control tools;
modifying the display to show the one or more monitoring tools for monitoring the first control tool, wherein the display includes fourth selectable indicators corresponding to the one or more monitoring tools;
receiving, via the display, a fourth selection of a first monitoring tool of the one or more monitoring tools; and
in response to the natural language query, generating for display a natural language response, the first activity, the first vulnerability, the first control tool, and the first monitoring tool.

16. The one or more non-transitory, computer-readable media of claim 15, wherein the second instance of the large language generative model further outputs one or more probabilities corresponding to the one or more vulnerabilities for the first activity, and wherein the instructions further cause operations comprising outputting, via the display, the one or more probabilities corresponding to the one or more vulnerabilities.

17. The one or more non-transitory, computer-readable media of claim 15, wherein the third instance of the large language generative model further outputs one or more likelihoods of success associated with the one or more control tools for the first vulnerability, and wherein the instructions further cause operations comprising outputting, via the display, the one or more likelihoods of success associated with the one or more control tools.

18. The one or more non-transitory, computer-readable media of claim 15, wherein the fourth instance of the large language generative model further outputs one or more measures of effectiveness associated with the one or more monitoring tools, the one or more measures of effectiveness indicating effectiveness of each monitoring tool of the one or more monitoring tools at monitoring the first control tool, and wherein the instructions further cause operations comprising outputting, via the display, the one or more measures of effectiveness associated with the one or more monitoring tools.

19. The one or more non-transitory, computer-readable media of claim 15, wherein the instructions further cause operations comprising inputting, into the third instance of the large language generative model, a prompt to train the third instance of the large language generative model to identify, for the vulnerabilities, corresponding control tools of the one or more available control tools, wherein the prompt indicates the one or more available control tools for addressing vulnerabilities.

20. The one or more non-transitory, computer-readable media of claim 15, wherein the instructions further cause operations comprising transmitting, to a system associated with the first vulnerability, an instruction comprising (i) a first indication of the first control tool and a second indication of the first monitoring tool and (ii) implementation instructions to cause the system to implement the first control tool and the first monitoring tool according to the implementation instructions.

* * * * *